US011232702B2

(12) United States Patent
Huseth et al.

(10) Patent No.: US 11,232,702 B2
(45) Date of Patent: *Jan. 25, 2022

(54) AUTOMATED SENSING OF FIREFIGHTER TEAMS

(71) Applicant: HONEYWELL INTERNATIONAL INC., Morris Plains, NJ (US)

(72) Inventors: Steve Huseth, Plymouth, MN (US); Cleopatra Cabuz, Eden Prairie, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,986

(22) Filed: Apr. 27, 2020

(65) Prior Publication Data

US 2020/0320855 A1 Oct. 8, 2020

Related U.S. Application Data

(63) Continuation of application No. 16/233,264, filed on Dec. 27, 2018, now Pat. No. 10,672,259.

(Continued)

(51) Int. Cl.
*G08B 27/00* (2006.01)
*G08B 25/10* (2006.01)
(Continued)

(52) U.S. Cl.
CPC ......... *G08B 27/001* (2013.01); *G08B 25/016* (2013.01); *G08B 25/10* (2013.01);
(Continued)

(58) Field of Classification Search
CPC . G01S 13/04; G01S 13/56; G01S 5/04; G01S 13/78; G01S 5/14; G08B 25/016; H04W 4/021; H04W 4/029
See application file for complete search history.

(56) References Cited

U.S. PATENT DOCUMENTS 7,263,379 B1 8/2007 Parkulo et al.
8,872,655 B2 10/2014 Buller
(Continued)

FOREIGN PATENT DOCUMENTS

KR 10-2007-0022852 A 2/2007
KR 10-0981660 B1 9/2010
KR 10-0988988 B1 10/2010

OTHER PUBLICATIONS

Communication pursuant to Article 94(3), for Application No. 18836579.5 dated Feb. 7, 2020, 8 pages.
(Continued)

*Primary Examiner* — Mirza F Alam
(74) *Attorney, Agent, or Firm* — Alston & Bird LLP

(57) ABSTRACT

A system and method for monitoring emergency personnel during an emergency incident is disclosed. The emergency personnel wear wireless communication units (CU) including a short-range radio and a long-range radio. CUs are configured to periodically transmit a unique identification from the short-range radio of the CU, receive the unique identification transmitted from the short-range radio of any other CU within range of the short-range radio, and transmit a data packet from the long-range radio, each data packet containing the unique identification of the CU and all the unique identifications recently received from any other CUs. The system can include an incident command monitoring system including a computing device to access a personnel and unique identifier database and analyze the data packets and initiate an alert if the unique identification associated with one of the emergency personnel has not been received by the communication unit of a team member.

17 Claims, 16 Drawing Sheets

Related U.S. Application Data

(60) Provisional application No. 62/612,199, filed on Dec. 29, 2017.

(51) Int. Cl.
  *H04W 4/024* (2018.01)
  *H04W 4/90* (2018.01)
  *G08B 25/01* (2006.01)
  *H04W 4/02* (2018.01)
  *H04W 4/80* (2018.01)

(52) U.S. Cl.
  CPC ............ *H04W 4/024* (2018.02); *H04W 4/90* (2018.02); *H04W 4/023* (2013.01); *H04W 4/80* (2018.02)

(56) References Cited

U.S. PATENT DOCUMENTS

| | | | |
|---|---|---|---|
| 2002/0008625 A1 | 1/2002 | Adams et al. | |
| 2005/0200487 A1 | 9/2005 | O'Donnell et al. | |
| 2006/0125630 A1 | 6/2006 | Parkulo | |
| 2006/0158329 A1 | 7/2006 | Burkley et al. | |
| 2007/0229356 A1* | 10/2007 | Kodrin | G01S 1/047 342/458 |
| 2014/0030982 A1 | 1/2014 | Cardona | |
| 2015/0077282 A1* | 3/2015 | Mohamadi | G01S 7/415 342/27 |
| 2017/0124846 A1 | 5/2017 | Li et al. | |
| 2017/0171754 A1* | 6/2017 | South | H04W 4/90 |
| 2018/0132555 A1* | 5/2018 | Gonzalez | A45F 5/021 |
| 2019/0174208 A1* | 6/2019 | Speicher | H04Q 9/00 |
| 2019/0174289 A1* | 6/2019 | Martin | H04W 4/90 |
| 2019/0191278 A1* | 6/2019 | Singh | G07C 9/00111 |

OTHER PUBLICATIONS

Hirabe et al., Effect on Group Detection Based on Human Proximity for Human Relationship Extraction in Daily Life, 46th International Conference on Parallel Processing Workshops, [Retrieved from the Internet Dec. 20, 2017], 2017, pp. 1-7.

International Search Report and Written Opinion dated May 9, 2019 for Application No. PCT/US2018/067884, 21 pages.

Invitation to Pay Additional Fees for International Application No. PCT/US2018/067884 dated Mar. 11, 2019, 12 pages.

Non-Final Rejection dated Sep. 10, 2019 for U.S. Appl. No. 16/233,264.

Notice of Allowance and Fees Due (PTOL-85) dated Feb. 3, 2020 for U.S. Appl. No. 16/233,264.

Rule 161 Communication for European Application No. 18836579.5, dated May 5, 2019.

U.S. Appl. No. 16/233,264, filed Dec. 27, 2018, US 2019-0206233 A1, Pending.

Annex to the communication dated Jul. 28, 2020 for EP Application No. 18836579.

Communication from the Examining Division dated Jul. 28, 2020 for EP Application No. 18836579.

Annex to the Communication Pursuant to Article 94(3) issued in European Application No. 18836579.5 dated Apr. 6, 2021, 4 pages.

Communication Pursuant to Article 94(3) issued in European Application No. 18836579.5 dated Apr. 6, 2021, 2 pages.

Decision to Grant issued in Korean Application No. 10-2019-7007593 dated Jun. 3, 2020, 3 pages.

\* cited by examiner

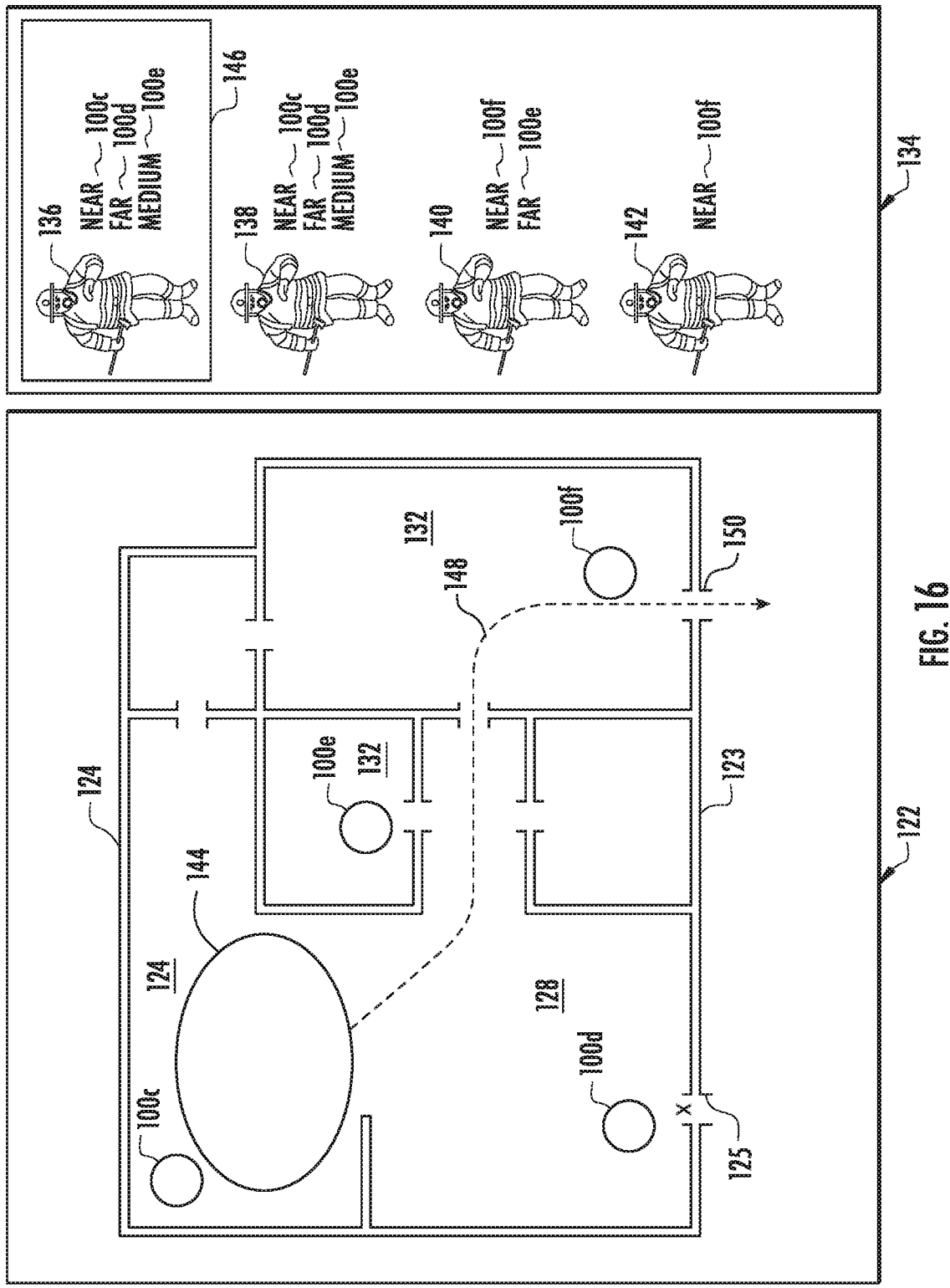

AUTOMATED SENSING OF FIREFIGHTER TEAMS

CROSS-REFERENCE TO RELATED APPLICATIONS

This application is a continuation of U.S. Non-Provisional patent application Ser. No. 16/233,264, filed Dec. 27, 2018, entitled "Automated Sensing of Firefighter Teams," which claims priority to, and the benefit of, U.S. Provisional Application No. 62/612,199, entitled "Automated Sensing of Firefighter Teams," filed Dec. 29, 2017, the entire disclosures of each of which are hereby incorporated by reference herein in their entireties.

TECHNICAL FIELD

This disclosure relates to personal protective equipment utilized by emergency response personnel such as firefighters and other first responders in emergency situations, and more particularly, to personal protective communication systems utilized by firefighters and other emergency responders during an emergency incident, and in even more particular applications, to personal protective communication systems integrated into a self-contained breathing apparatus (SCBA) or a gas detector, or another piece of personal protective equipment utilized by firefighters and other emergency responders during an emergency incident.

BACKGROUND

Incident commanders (IC's) manage firefighters as teams rather than individuals in order to manage complexity and ensure firefighter safety. These teams are typically defined by the engine or the vehicle the firefighter has been assigned to. During firefighter operations, firefighters are taught to remain in close proximity to other team members to prevent firefighters from becoming isolated from the team, particularly when visibility is reduced by smoke and debris. If a team has been assigned to a specific firefighting task or zone of the incident location (e.g., venting a roof, search and rescue, advancing on a specific side of a building, etc.) and the IC has not heard about any emergencies from the team leader or any of the members of the team, the fire chief may assume the team is in a specific location and progressing as instructed and that no additional action, resources, or emergency response personnel is required. However, a firefighter becoming separated from the team either accidentally (such as, for example, falling through a floor of a burning structure or becoming isolated when a ceiling of the building collapses) or intentionally (e.g., when a firefighter remains behind the team or starts off away from the team intentionally), represents a high risk situation that requires immediate response. Such situations are difficult to prevent and predict, and responding to such situations can place other emergency personnel at risk. Likewise, even if emergency personnel are in close proximity to their team, the complexity and confusion of emergency response incidents can make it difficult to determine when a particular firefighter or the like is in distress, is experiencing undesirable health impacts, and/or is at risk of health impacts.

Since physical proximity of the members of a team to each other is often more significant than having the precise location of each firefighter, there is a need for systems that can monitor the relative proximity of the firefighters to each other as an indication of firefighter safety, and/or monitor firefighter health characteristics and alert the IC to firefighters at risk.

SUMMARY

Disclosed generally herein are systems, apparatuses, and method for alerting an incident commander (IC) about emergency response personnel at risk during emergency response. An apparatus can include a wearable communication unit (CU) that includes a long-range radio for sending data to a monitoring system operated by the IC and a short-range radio (such as a radio configured to transmit and receive signals according to various transmission protocols, e.g., Bluetooth protocols) for monitoring one or more other CUs in the immediate vicinity of the monitored CU. The CU can use the short-range radio to exchange identification signals with other CUs, e.g., to determine the identity of nearby firefighters, the proximity of nearby firefighters, to exchange signals indicative of health characteristics and/or environmental conditions, and the like. According to some embodiments, a firefighter that has become lost or disconnected from the team, e.g., in an adjacent room of a structure, or as a result of falling through the floor or a ceiling collapse, will no longer be able to exchange short-range radio signals with other members of the team and will be marked by the monitoring system as disconnected from the team. The marked firefighter can then be identified in the form of an alert to the IC, who can check the validity of the alert with the team lead, deploy resources to find and recover the marked firefighter, and/or the like. According to other embodiments, a firefighter experiencing undesirable health effects or environmental/exposure conditions can be marked, the IC can be alerted to the undesirable condition or health impacts for the marked firefighter, and the IC can respond, e.g., by recalling the marked firefighter, by deploying additional resources or personal protective equipment, etc. Furthermore, during search and rescue operations, when a search team comes into the vicinity of a disconnected or at-risk firefighter, the short-range radios of the search team's CUs can be configured to detect the presence of the disconnected firefighter via the identification signals from the firefighter's short-range radio, thereby limiting the size of the search area. In many applications, it would be most convenient to integrate the CU into the communication unit of an SCBA, particularly since SCBA's are becoming increasingly sophisticated with respect to the incorporation of electronics and since each of the firefighters will typically be employing an SCBA. However, in some applications it may be desired for the CU's to be provided as a stand-alone unit with its own independent housing, sensors, electronics, receiver, transceiver, and other suitable components, that can be attached to another piece of the firefighter's personal protective equipment, such as the firefighter's bunker gear, or carried in a pocket of the firefighter's gear. In many applications it will be convenient for the monitoring system to be provided in the form of a personal computing device that either includes an integrated long-range radio or is linked to a long-range radio via a hardwire or wireless connection.

In accordance with some embodiments, a safety system is provided to monitor a plurality of firefighting teams during an emergency incident, each firefighting team having a plurality of firefighters assigned as team members. The system can include a plurality of wearable wireless CUs and an incident command monitoring system. Each communication unit can include a short-range radio and a long-range radio. Each short-range radio can be tuned to have a limited line-of-sight range, e.g., no greater than about 50 feet, about 40 feet, about 30 feet, about 20 feet, or about 10 feet, inclusive of all values and ranges therebetween. Each long-range radio can be tuned to have a longer line-of-sight range that does not overlap with the line-of-sight range of the short-range radio, e.g., at least about 100 feet, about 150 feet, about 200 feet, about 250 feet, about 300 feet, about 350 feet, about 400 feet, about 450 feet, about 500 feet, or about 1,000 feet, inclusive of all values and ranges therebetween. Each CU can be configured to periodically transmit a unique identification from the short-range radio of the communication unit, receive the unique identification transmitted from the short-range radio of any other CU within the specified line-of-sight range of the short-range radio, and transmit a data packet from the CU using the long-range radio, e.g., to the IC's monitoring system or components thereof. Each data packet can contain the unique identification of the CU and all the unique identifications recently received from any other nearby CU, as well as any desired health effect or environmental exposure information related to the firefighter wearing the CU or other firefighters nearby wearing other CUs. The incident command monitoring system can include a memory device containing a database of the unique identifications, with each unique identification associated with a specific firefighter, and each firefighter assigned as a team member of one of the plurality of firefighting teams. The incident command monitoring system can include a long-range radio configured to receive the data packets from the plurality of CUs. The incident command monitoring system can include a central processor configured to access the database and to analyze the data packets to determine if each unique identification associated with each firefighter was been received by the CU of a team member of each firefighter's assigned firefighting team, and to initiate an alert if the unique identification associated with one of the firefighters has not been received by the CU of a team member of the firefighter's assigned firefighting team. For instance, in some embodiments, a single CU may not transmit the unique identification associated with each of the other CUs associated with a firefighter's team, indicating that the firefighter is likely disconnected from the team. Additionally or alternative, in some embodiments, each of the other CUs associated with other firefighters of the team may fail to transmit the unique identification of the firefighter's CU, indicating that the firefighter is likely disconnected from the team. In some embodiments, one or more CU associated with a first set of firefighters from the team may fail to transmit the unique identification of two or more other CUs associated with a second set of firefighters from the team, indicating that either the first set or second set of firefighters has become disconnected from the team, e.g., based upon which set of firefighters includes the team lead.

In some embodiments, each CU can be integrated into a wireless communication system of a self-contained breathing apparatus. In some embodiments, each CU can be integrated into a gas detector unit. In some embodiments, each CU can be integrated into another suitable device such as a mobile phone, personal digital assistant device, heads-up display, helmet visor display, or combinations thereof, can be a standalone CU device, and/or can be integrated into garments or fabrics of the personal protective equipment worn by the emergency personnel (e.g., firefighters).

In accordance with some embodiments, a safety system can include one or more sensors configured to collect, measure, detect, or otherwise receive health and/or environmental data related to emergency personnel health concerns and environmental conditions/exposure risks.

In some embodiments, the monitoring system can include a user display operably connected to the central processor and wherein the central processor is configured to command the user display to provide a visual representation of each firefighting team, including the individual firefighters in the firefighting team, and to provide a visual indicator of any firefighter whose unique indication has not been received by the communication unit of a team member of the firefighter's assigned firefighting team.

As one feature, the central processor is configured to access the database and analyze the data packets to determine if the unique identification associated with one of the firefighters was received by a communication unit not associated with the firefighting team to which the one of the firefighters is assigned, and to initiate a notice if the unique identification associated with one of the firefighters has been received by a communication unit not associated with the one of firefighter's assigned firefighting team. In a further feature, the central processor is configured to determine which firefighting team is associated with the communication unit not associated with the one of the firefighter's assigned firefighting team. According to one further feature, the notice includes both the name of the one of the firefighters and an identifier of the firefighting team associated with the communication unit not associated with the one of the firefighters' assigned firefighting team.

In an embodiment, an emergency responder tracking system may comprise a beacon comprising a radio frequency module; a telemetry module, wherein the telemetry module is mounted on a self-contained breathing apparatus and is configured to receive a wireless signal from the beacon and transmit the wireless signal to a computer system, wherein the computer system comprises a user interface and is configured to receive the wireless signal from the telemetry module and provide a map, in the user interface, of a location of the beacon; wherein the wireless signal comprises a unique identifier, a location of the beacon, a last detected location of an emergency responder, and/or current time.

In an embodiment, a method for tracking an emergency responder may comprise attaching a plurality of beacons to a structure within a building, wherein each beacon comprises a radio frequency module; activating each beacon; communicating to a computer system a description of a placement of each beacon relative to surrounding structures; transmitting information from each beacon to a telemetry module, wherein the telemetry module is mounted on a self-contained breathing apparatus of an emergency responder; transmitting the information from the telemetry module to the computer system; drawing a floor plan, with the computer system, of the building based on the description; and displaying in the user interface, the floor plan and location of each beacon; wherein the information comprises a unique identifier, the location of each beacon, a last detected location of the emergency responder, and/or current time.

In an embodiment, a method for directing an emergency responder may comprise attaching a plurality of beacons to a structure within a building, wherein each beacon comprises a radio frequency module; activating each beacon; communicating to a computer system a description of a placement of each beacon relative to surrounding structures; transmitting information from each beacon to a telemetry module, wherein the telemetry module is mounted on a self-contained breathing apparatus of an emergency responder; transmitting the information from the telemetry module to the computer system; drawing a floor plan, with the computer system, of the building based on the description; drawing an exit route for the building, with the computer system based on the description; displaying in the user interface, the floor plan, the exit route, and location of each beacon; and directing an emergency responder to the exit based on signal strength between each beacon and the telemetry module; wherein the information comprises a unique identifier, the location of each beacon, a last detected location of the emergency responder, and/or current time.

According to some embodiments, a safety system can be configured to monitor a plurality of firefighting teams during an emergency incident. In some embodiments, each firefighting team can comprise a plurality of firefighters assigned as team members. In some embodiments, the safety system can comprise a plurality of wearable wireless communication units, each communication unit comprising a short-range radio and a long-range radio, each short-range radio tuned to have a line-of-sight range of no greater than 30 feet, each long-range radio tuned to have a line-of-sight range of at least 300 feet. In some embodiments, each communication unit can be configured to periodically transmit a unique identification from the short-range radio of the communication unit. In some embodiments, each communication unit can be configured to periodically receive the unique identification transmitted from the short-range radio of any other communication unit within the range of the short-range radio. In some embodiments, each communication unit can be configured to periodically transmit a data packet from the long-range radio, each data packet containing the unique identification of the communication unit and all the unique identifications recently received from any other communication units. In some embodiments, the safety system can further comprise an incident command monitoring system. In some embodiments, the incident command monitoring system can comprise a memory containing a database of the unique identifications, with each unique identification associated with a specific firefighter, and each firefighter assigned as a team member of one of the plurality of firefighting teams. In some embodiments, the incident command monitoring system can comprise a long-range radio configured to receive the data packets from the plurality of communication units. In some embodiments, the incident command monitoring system can comprise a central processor configured to access the database and to analyze the data packets to determine if each unique identification associated with each firefighter was been received by the communication unit of a team member of each firefighter's assigned firefighting team, and to initiate an alert if the unique identification associated with one of the firefighters has not been received by the communication unit of a team member of the firefighter's assigned firefighting team.

In some embodiments, each communication unit can be integrated into a wireless communication system of a self-contained breathing apparatus. In some embodiments, each communication unit is integrated into a gas detector unit. In some embodiments, the incident command monitoring system can further comprise a user display operably connected to the central processor, wherein the central processor is configured to command the user display to provide a visual representation of each firefighting team, including the individual firefighters in the firefighter team, and to provide a visual indicator of any firefighter whose unique indication has not been received by the communication unit of a team member of the firefighter's assigned firefighting team. In some embodiments, the central processor can be configured to access the database and analyze the data packets to determine if the unique identification associated with one of the firefighters was received by a communication unit not associated with the assigned firefighting team of the one of the firefighters, and to initiate a notice if the unique identification associated with one of the firefighters has been received by a communication unit not associated with the assigned firefighting team of the one of firefighters. In some embodiments, the central processor can be configured to determine which firefighting team is associated with the communication unit not associated with the one of the firefighter's assigned firefighting team. In some embodiments, the notice can include both the name of the one of the firefighters and an identifier of the firefighting team associated with the communication unit not associated with assigned firefighting team of the one of the firefighters.

According to other embodiments, a safety system can comprise a wireless communication unit comprising a short-range radio and a long-range radio, the short-range radio configured to receive a signal from a sensor, the signal indicative of an environmental metric or biometric of a firefighter. In some embodiments, the communication unit can be configured to periodically receive the signal transmitted from the sensor. In some embodiments, the communication unit can be configured to periodically transmit a data packet from the long-range radio, each data packet containing a unique identification of the communication unit and the signal received from the sensor. In some embodiments, the safety system can further comprise an incident command monitoring system. In some embodiments, the incident command monitoring system can include a memory containing a database of a plurality of unique identifications associated with a plurality of firefighters. In some embodiments, the incident command monitoring system can include a long-range radio configured to receive the data packets from the plurality of communication units. In some embodiments, the incident command monitoring system can include a central processor configured to access the database and to analyze the data packets to determine the firefighter associated with the wireless communication unit based on a unique identification associated with the firefighter in the database, compare the environmental metric or biometric to an acceptable range for the environmental metric or biometric, and to initiate an alert associated with the firefighter if the environmental metric or biometric is outside the acceptable range.

In some embodiments, the sensor can be configured to measure a temperature of an atmosphere surrounding the sensor, a concentration of a flammable gas in an atmosphere surrounding the sensor, and/or a biometric of the firefighter. In some embodiments, the biometric can be at least one from among a core body temperature of the firefighter, a heart rate of the firefighter, a blood pressure of the firefighter, a rate of perspiration of the firefighter, a concentration of electrolytes in a fluid of the firefighter, a respiration rate of the firefighter, or combinations thereof.

In some embodiments, the wireless communication unit can be further configured to receive signal from one or more other wireless communication units associated with one or more other firefighters nearby the firefighter. In some embodiments, the wireless communication unit can be further configured to transmit the signal from the one or more other wireless communication units to the incident command monitoring system.

According to other embodiments, a wireless communication unit can comprise a processor, a memory, a short-range radio, and/or a long-range radio. In some embodiments, the short-range radio can be tuned to have a line-of-sight range of no greater than about 30 feet and the long-range radio can be tuned to have a line-of-sight range of at least about 300 feet. In some embodiments, the wireless communication unit can be configured to periodically transmit a unique identification from the short-range radio of the communication unit, receive one or more signals indicative of one or more other unique identifications transmitted from the short-range radio of one or more other wireless communication units within the line-of-sight range of the short-range radio, and/or transmit a data packet from the long-range radio, each data packet comprising the unique identification of the wireless communication unit and the one or more other unique identifications received from the one or more other wireless communication units.

In some embodiments, the wireless communication unit can be configured to transmit the data packet between every 1 second and every 60 seconds. In some embodiments, the processor, along with the memory, can be configured to determine a signal strength of the one or more signals, the signal strength indicative of a proximity of the one or more other wireless communication units to the wireless communication unit. In some embodiments, the wireless communication unit can be configured to transmit the signal strength of the one or more signals received from the one or more other wireless communication units with the data packet. In some embodiments, the wireless communication unit can be further configured to periodically receive one or more other signals indicative of an environmental metric or a biometric from one or more sensors. In some embodiments, the environmental metric or biometric received from the one or more sensors can comprise a temperature of an atmosphere surrounding the one or more sensors, a concentration of a flammable gas in the atmosphere surrounding the one or more sensors, a core body temperature of a firefighter, a heart rate of the firefighter, a blood pressure of the firefighter, a rate of perspiration of the firefighter, a concentration of electrolytes in a fluid of the firefighter, a respiration rate of the firefighter, or combinations thereof.

Other features and advantages will become apparent from a review of the entire specification, including the appended claims and drawings.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 12 is a schematic illustration of a breadcrumb telemetry system, according to an embodiment.

FIG. 16 is a schematic illustration of a user interface showing an exit route, according to an embodiment.

DETAILED DESCRIPTION

Figure 1:
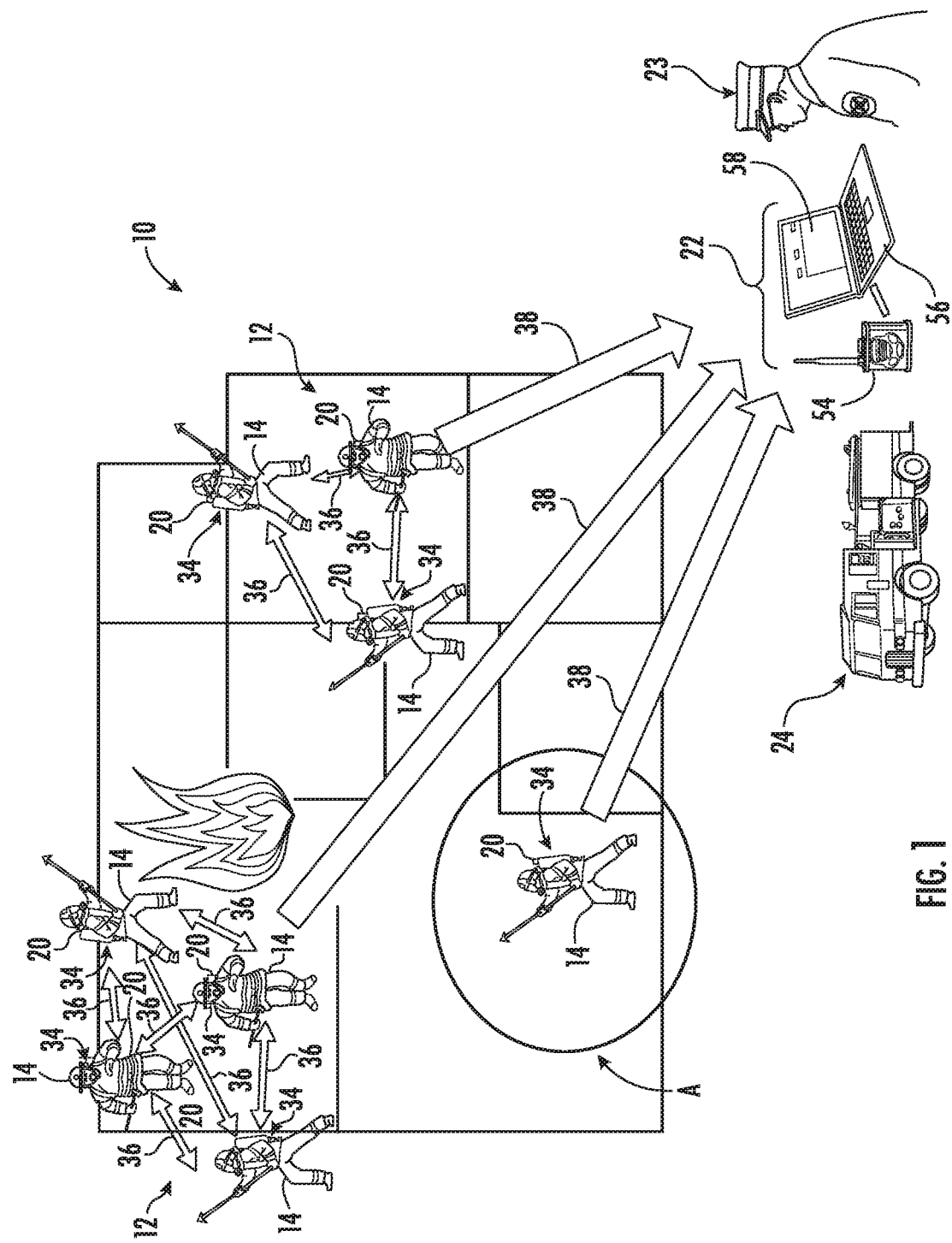
FIG. 1 is a diagrammatic representation of a safety system for monitoring a plurality of firefighting teams during an emergency incident, according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Locating emergency personnel (also called "firefighters," "first responders," and the like) on the grounds of an active incident and monitoring health metrics and environmental conditions for emergency personnel have been key unmet needs for some time. Precise location and tracking has been demonstrated to be feasible, but is currently orders of magnitude beyond acceptable cost targets. While some systems such as a Global Positioning System (GPS) could be used, such systems may not work within a closed structure and/or may not always be accurate enough to differentiate the location of one firefighter from others nearby. Similarly, there is an unmet need for systems, apparatuses, and methods for monitoring health characteristics and/or environmental exposures for emergency personnel.

Frequently, incident commanders may need to know the vicinity (e.g., side of the building, floor of the building) of a team member, rather than an exact position. Current methods rely on an acoustic PASS sound when a firefighter is in trouble. However, when a firefighter becomes separated by even a short distance, the high ambient noise of an active fire may obscure the PASS alarm. GPS is typically unavailable inside buildings. Alternate technologies have been developed to provide precise location and tracking however, these systems are currently orders of magnitude beyond acceptable cost targets and have a number of critical failure modes. Such systems also often consume large amounts of power from the devices carried by the emergency personnel. With SCBAs providing often less than 20 minutes of available air, localization, rescue, and extraction of a fallen firefighter must typically be conducted in the span of less than 8 minutes. In addition to providing the location of a downed firefighter, the system must also provide the location using reference points that are knowable to the incident commander in order to know where to send rescue teams. Typically this might be a map of the building, however, such maps are generally not available and any location information cannot be provided in the context of a building map. The need to provide instant access to actionable location and/or personnel health/safety information consistently remains a top need by fire departments and other emergency response organizations.

Figure 2:
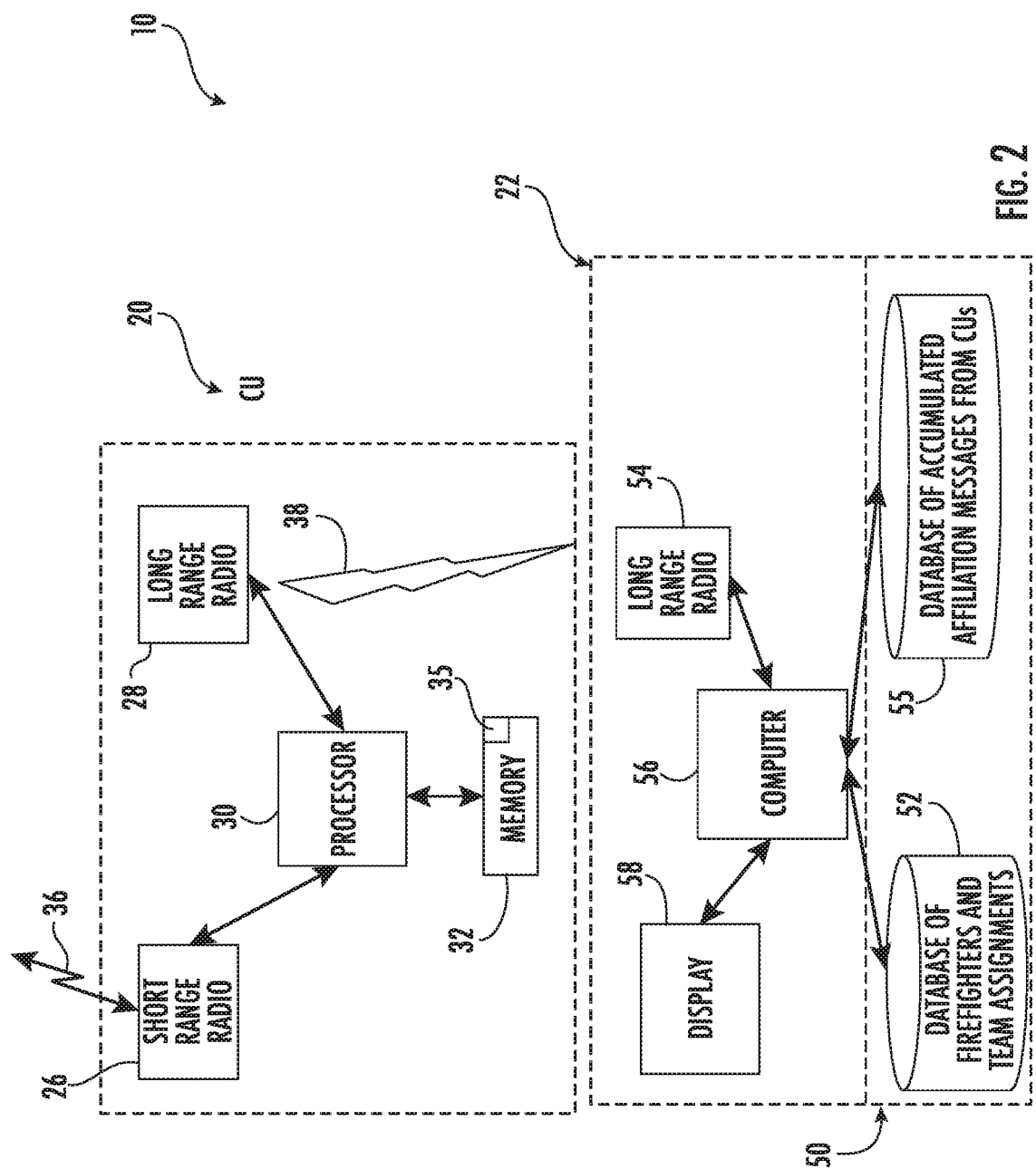
FIG. 2 is a diagrammatic representation of a method for monitoring a plurality of firefighting teams during an emergency incident, according to an embodiment.

Referring now to FIGS. 1 and 2, a safety system and method 10 are illustrated for monitoring a plurality of firefighting teams 12 during an emergency incident, such as a fire, with each firefighting team 12 having a plurality of firefighters 14 assigned as team members. The safety system 10 includes a plurality of wireless communication units 20, with each communication unit 20 assigned to and carried by a specific one of the firefighters 14. The system 10 also includes a centralized, incident command monitoring system 22 that is monitored/operated by an incident commander 23 and will typically be located within an incident command vehicle 24. As best seen in FIG. 2, each communication unit 20 includes a short-range radio 26 and a long-range radio 28.

In the illustrated embodiment, each short-range radio 26 is tuned to have a line-of-sight range of no greater than 30 feet, and each long-range radio 28 is tuned to have a line-of-sight range of at least 300 feet. It should be understood that in some applications it may be desirable for the line-of-sight range for the short-range radio 26 to be less than or greater than 30 feet and, similarly, for the line-of-sight range of the long-range radio 28 to be less than or greater than 300 feet. The most desirable line-of-sight range for the radios 26 and 28 will often be dictated by the particulars of each application, including, for example, the environment in which it is anticipated the firefighters will be operating, the anticipated spread or distance of each of the firefighters 14 in a team 12 when they are working at an incident, the size of the incident, and the anticipated distance of any firefighting team from the incident command center where the incident commander 23 is located.

Each communication unit 20 will further include a processor 30 operably connected to the short-range radio 26 and the long-range radio 28 and to a memory 32 to allow the processor 30 to send control signals to each of the radios 26 and 28, to receive signals from each of the radios 26 and 28, and to store and receive data into and out of the memory 32. Although it is not shown, each communication unit 20 will also include a power source, such as a suitable battery.

In the embodiment illustrated in FIG. 1, each of the communication units 20 is integrated into an SCBA 34 that is assigned to and worn by a specific firefighter 14. In some applications, it will be desirable for each of the communication units 20 to be a self-contained unit with its own housing that can be carried in a pocket of the firefighters bunker gear, and/or attached to another piece of personal protective equipment that is worn by a firefighter 14. Additionally, in some applications it will be desirable for each communication unit 20 to be integrated into other types of personal protective equipment that is commonly carried and utilized by a firefighter, including, for example, a gas detector.

Each communication unit 20 is configured to, at least periodically, transmit a unique identification 35 from the short-range radio of the communication unit, as shown schematically at 36 in FIGS. 1 and 2, receive the unique identification 35 transmitted form the short-range radio 26 of any other communication unit 30 within the range of the short-range radios, again as shown at 36 in FIGS. 1 and 2, and to transmit a data packet from the long range radio, as shown schematically at 38 in FIGS. 1 and 2. Each data packet 38 contains the unique identification 35 of the transmitting communication unit 20 and all the unique identifications 35 recently received from any other communication unit 20 by the transmitting communication unit 20. The processor 30 is configured to operate the radios 26 and 28 to perform the above functions, to store the unique identifications 35 received from other communication units 20, and to retrieve the unique identifications 35 from the memory 32 each time a data packet 38 is transmitted via the long-range radio 28. While any suitable unique identifier can be used for each of the unique identifications 35, in many applications it will be desirable to utilize a 128-bit identifier, such as a universal unique identifier (UUID)/globally unique identifier (GUID).

Figure 3:
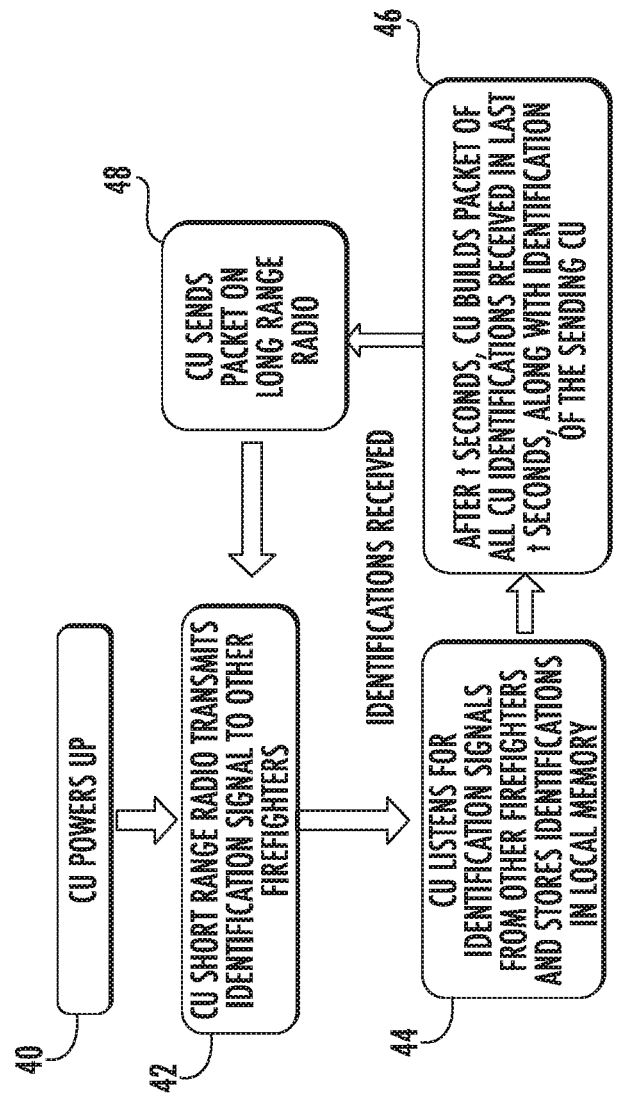
FIG. 3 is a flow chart illustrating the operation of a communication unit utilized in the safety system of FIGS. 1 and 2.

One example of the operation of each communication unit 20 is shown in FIG. 3. After the communication unit 20 is turned on, as shown at block 40, the short-range radio 26 will transmit the identification signal 36 to the communication units 20 of the other firefighters 14, as shown at block 42. At the same time, the short-range radio 26 of the communication unit 20 is listening for the identification signals 36 from the communication units 20 of the other firefighters 14 and the processor 30 stores any received identifications 35 into the memory 32, as shown at block 44. After a predetermined period of time t, the processor 30 of the communication unit 20 builds the data packet 38 of all of the communication unit identifications 35 that were received during that time period t, together with the identification 35 of the CU 20, as shown at block 46. The predetermined period of time t can be any suitable time period. In many applications it will be desirable for the time period t to be in the range of one second to ten seconds, but in other applications greater or lesser time periods t may be desired. In some embodiments, the communication unit 20 can transmit the data packet 38 to the incident command monitoring system 22, as shown at block 48. In other embodiments, the communication unit 20 for each firefighter 14 can transmit to a team lead, which can be any designated firefighter 14 from among the team 12. In some embodiments, the team lead may compile the data packets 38 from each firefighter 14 in the team 12 and transmit a single signal, e.g., via the long-range radio, to the incident command monitoring system 22. It should be understood that for every time period t, the communication unit 20 will typically perform the steps shown at blocks 42 and 44 multiple times. As long as the communication unit 20 is powered up, it will repeat these functions, as shown in FIG. 3.

Figure 5:
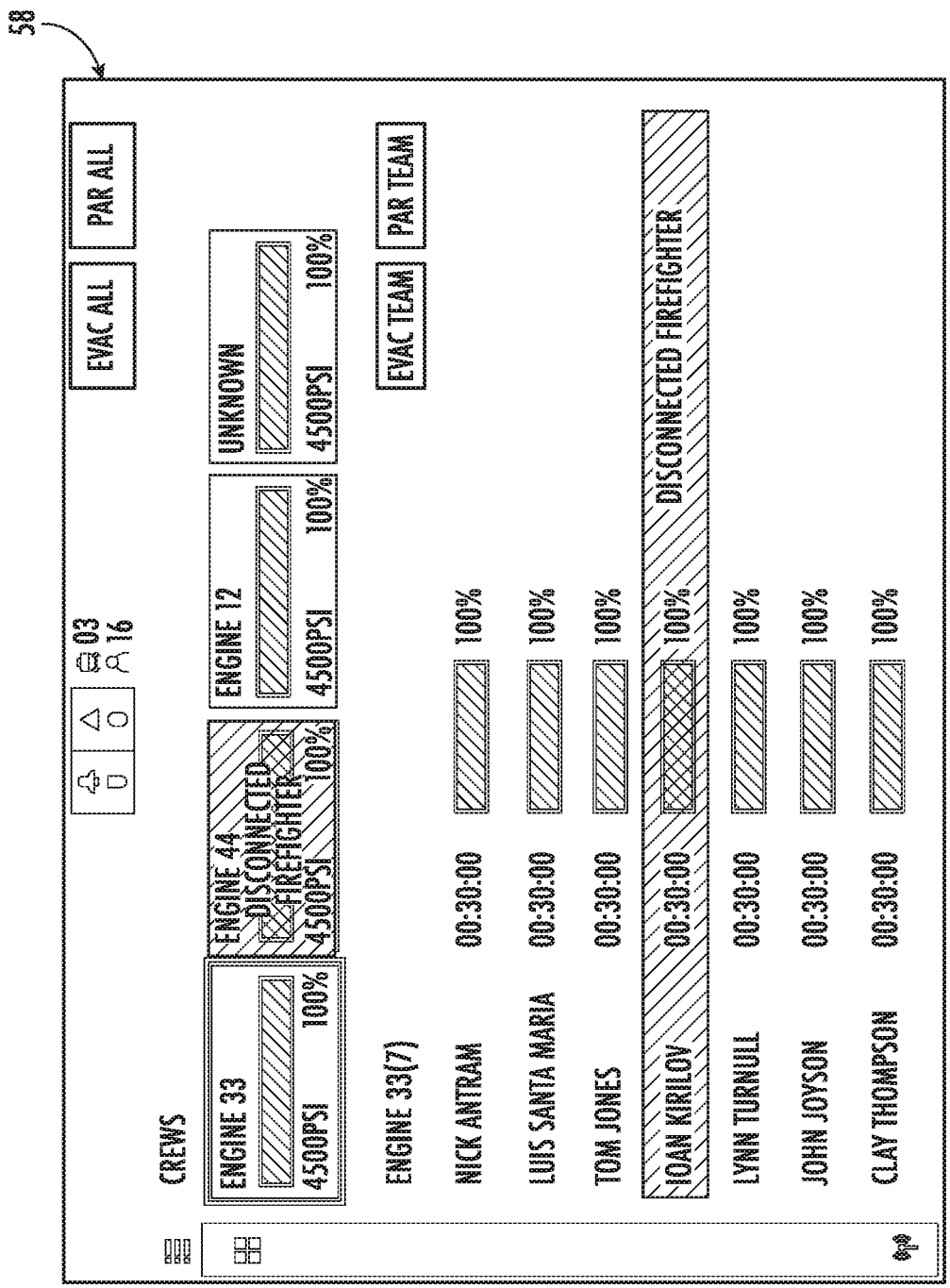
FIG. 5 is a view of a user display of the incident command monitoring system, according to an embodiment.

Again with reference to FIG. 2, the incident command monitoring system 22 can include a memory 50 containing a database 52 of unique identifications 35, with each unique identification associated with a specific firefighter 14, and each firefighter 14 assigned as a team member of one of the plurality of firefighting teams 12. The incident command monitoring system 22 can include a long-range radio 54 configured to receive the data packets 38 from the plurality of communication units 20 and/or from the team lead of each team 12. In some embodiments, the incident command monitoring system 22 can include a database 55 of the data from the data packets 38 received by the long-range radio 54. In some embodiments, the incident command monitoring system 22 can include a central processor/computer 56 operably connected to the databases 52 and 55 and the long-range radio 54 and configured to send and receive or cause sending and cause receiving of control and data signals from each of those components. In some embodiments, the central processor 56 can be configured to access the databases 52 and 55 and to analyze the data packets 38 to determine if each unique identification 35 associated with each firefighter 14 has been received by the communication unit 20 of a team member of each firefighter's 14 assigned firefighting team 12, and to initiate an alert if the unique identification 35 associated with one of the firefighters 14 has not been received by the communication unit 20 of a team member or the firefighter's assigned firefighting team 12. In this regard, the incident command monitoring system 22 can further include a user interface 58, such as a user display 58 and the processor 56 can be configured to initiate the alert in the display 58. In some embodiments, the processor 56 can be configured to initiate the alert in the display 58 by commanding the display 58 to provide a visual representation of each firefighting team 12, including the individual firefighters 14 in the firefighting team 12, and to provide a visual indicator of any firefighter 14 whose unique identification 35 has not been received by the communication unit 20 of a team member of the firefighter's assigned firefighting team 12, as shown in FIG. 5.

Figure 4:
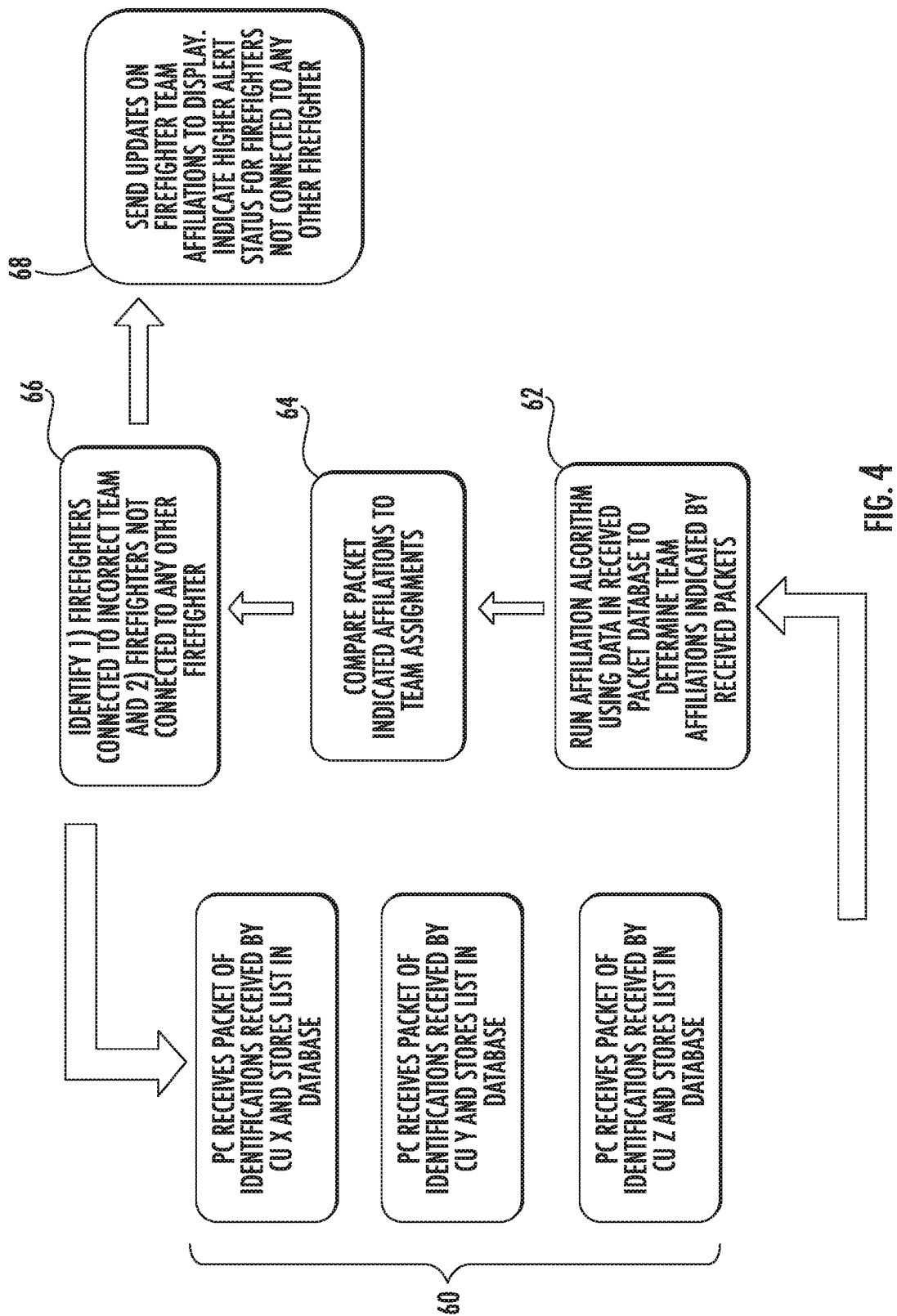
FIG. 4 is a flow chart illustrating the operation of an incident command monitoring system of the safety system of FIGS. 1 and 2.

With reference to FIG. 4, the operation of one embodiment of the incident command monitoring system 22 is illustrated, with the central processor 56 receiving each of the data packets 38 from the communication units 20 via the long-range radio 54, and stores them in the database 55, as shown at 60. The central processor 56 then runs an algorithm or other such computer-implemented process or method, using the data in the received data packet database 55, to determine the team affiliations indicated by the received data packets 38. The central processor 56 can then compare the indicated affiliations to the actual team assignments stored in the database 52 of firefighters and team assignments, as shown at blocks 62 and 64. The central processer 56 can use association mapping and graph theory to develop most likely clusters of firefighters 14. In response to the results from block 64, the central processor 56 can then identify any firefighters 14 connected to an incorrect team 12 and any firefighters 14 than are not connected to any other firefighter 14 or any other firefighting team 12, as shown at block 66. In some embodiments, the central processor 56 can then send updates on the firefighting team affiliations to the display 58, as shown at block 68. Additionally, as shown at block 68, the central processor 56 can command the display 58 to indicate a higher alert status for firefighters 14 not connected to any other firefighter 14 or team 12. In other words, an alert can be displayed for a firefighter 14 that is not located nearby their assigned team 12, and an elevated or more urgent alert (e.g., using a different alert color, using different alert language or text or icon, by using a flashing alert indicator, etc.) to indicate a firefighter 14 that is not located nearby any team 12 in the incident response area. The user interface 58 of the incident command monitoring system 22 provides a visual display of the teams 12, allows the IC 23 to identify individual members of each team 12, and provides notification of a change in which team 12 firefighters 14 are with. Individual firefighters 14 switching teams 12 or becoming disassociated from their assigned team 12 are highlighted on display 58.

It should be understood that any suitable protocol can be utilized for the short-range radio transmission, including, for example, any suitable Bluetooth protocol, including those protocols defined by the trade organization Bluetooth SIG. Similarly, any suitable long-range radio protocol may be utilized for the long-range radios 28 and 54. Furthermore, it should be appreciated that there are a number of ways to "tune/adjust" the range of the radios 26, 28 and 54, including, for example, adjusting the power output of the transmitter of the radio.

Automatically monitoring the nearness of members of a team 12 to each other can provide highly valuable information to the incident commander (IC) 23 earlier and more consistently than if it was reported by the team leader using the firefighter radio. In this regard, the connection of the firefighters 14 with their assigned teams 12 can be described in terms of three levels of risk:

(1) all connected;
(2) misconnected; and
(3) disconnected.

When an IC 23 receives an indication from the safety system 10 that all the firefighters are with their assigned teams, the level of risk is at its lowest and it can be considered as an "all connected" risk level. When an IC 23 receives an indication from the safety system 10 that one or more firefighters 14 have become separated from the assigned team 12, but that each of the one or more firefighters 14 are nearby another team 12 to which they are not assigned, the firefighters 14 can still be considered as safe but possibly confused or off task, and the firefighters 14 or the team leads may require notification that the firefighters 14 for which the alert was displayed are not with their assigned team 12. This level of risk can be referred to as "misconnected" because the firefighter 14 is "misconnected" with a firefighting team 12 to which the firefighter 14 was not assigned. If a firefighter 14 is separated and the safety system 10 does not show an association with any other team 12, this indicates that the firefighter 14 is down, lost, has left the incident response area, has a malfunctioning communication unit 20, has responded to another issue or task that presented itself during the course of responding to the incident, is dangerously free lancing, or the like. In any case, immediate notification to the IC 23 allows the IC 23 to respond by trying another way to communicate with the firefighter 14 that is not with any team 12, allocate additional resources (e.g., a drone, additional firefighters 14, a search and rescue team, or the like), or respond in another way, as desired. This situation can be referred to as "disconnected" because the firefighter 14 is completely "disconnected" from all other firefighters 14 and firefighting teams 12, and this alert indicates the highest level of risk for the firefighter 14 associated with the "disconnected" alert.

The disclosed system and method 10 provides an IC 23 with a visual display of sensed firefighting team membership using the short-range radio 26 on each CU 20. This visual display can include an identification of any firefighters 14 that have become disconnected from assigned team 12 (through accident, miscommunication, unintentional drifting to work with an adjacent team 12, free lancing, etc.). The disconnected firefighter 14 can be quickly highlighted by the system to the IC 23 as needing potential intervention, and the IC 23 can attempt to contact the disconnected firefighter 14 using two-way communications via the long-range radios 28 and 54 or another way. Similarly, if the system 10 provides an IC 23 with an alert that a firefighter 14 is misconnected, the IC 23 can again attempt to contact the firefighter 14 directly via the radios 28 and 54 in order to instruct the firefighter 14 to rejoin the appropriate team 12 to which the firefighter 14 is assigned.

Just as the risk of emergency personnel from their teams or becoming lost inside a structure or emergency response zone is serious, exposure to hazardous materials and environmental conditions likewise represent serious risks to emergency personnel. In particular, firefighters operate in a number of dangerous environments. With the emergence of telemetry systems integrated into firefighter SCBAs 34, the incident commander 23 and/or the incident command monitoring system 22 is provided with critical information on air level, firefighter status, and emergency alarms that have been designed into the telemetry system. Additional dangers exist from gas, heat, lack of vision, flashover, the short-term and long-term health effects of exposure to such materials and conditions, team integrity, and the like. Current sensors are too bulky, impractical, and costly, and not durable enough to be integrated into currents. In addition, current personal protective equipment, such as conventional SCBAs, were not designed for integration of sensors, radios, GPS, or other equipment, and such integration often requires rigorous research, testing, and certification for use, which has previously prevented the direct connection of new sensors to conventional SCBAs after testing and/or certification.

Figure 6:
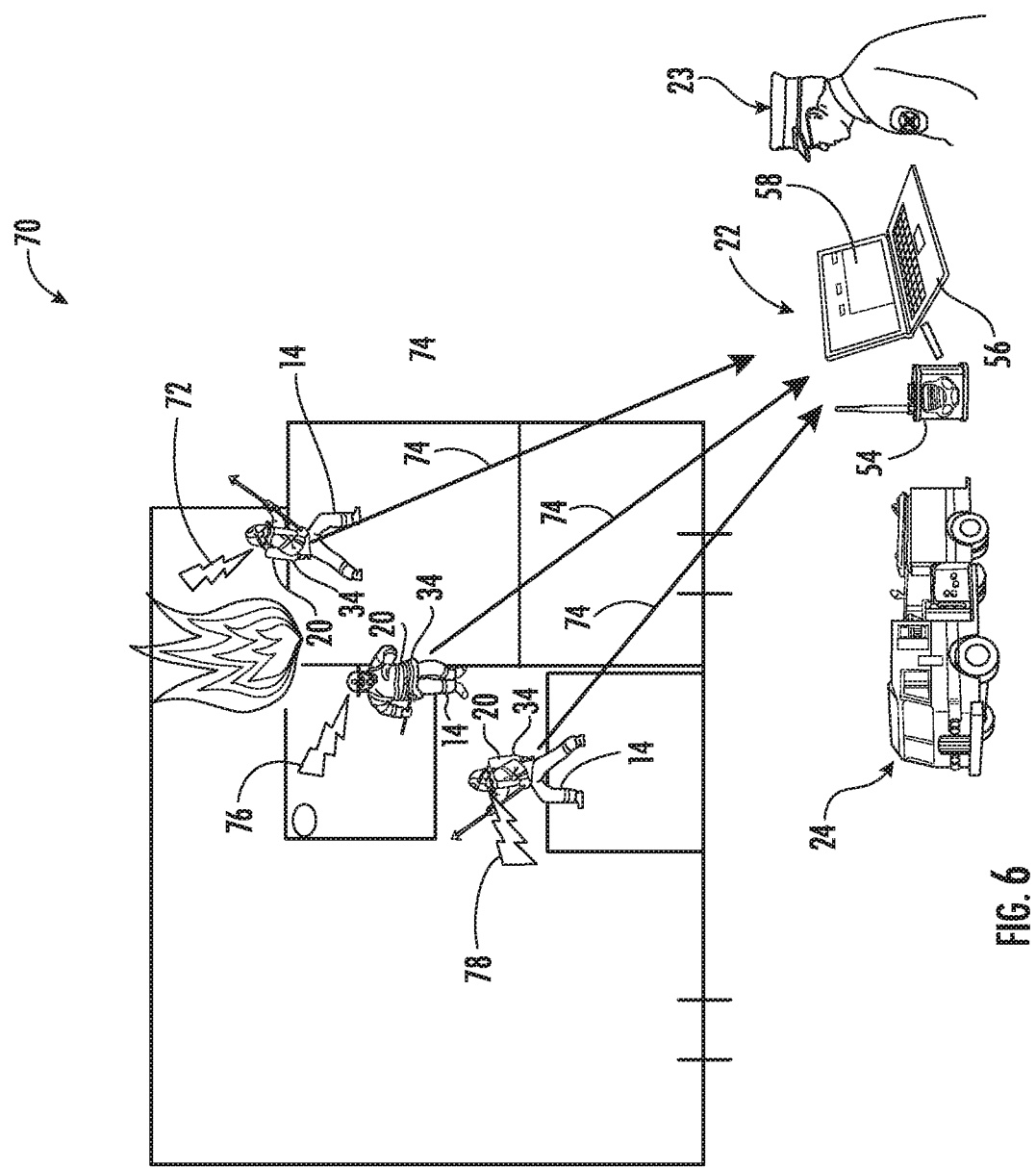
FIG. 6 is a diagrammatic representation of a safety system for monitoring a plurality of firefighters during an emergency incident, according to an embodiment.
Figure 7:
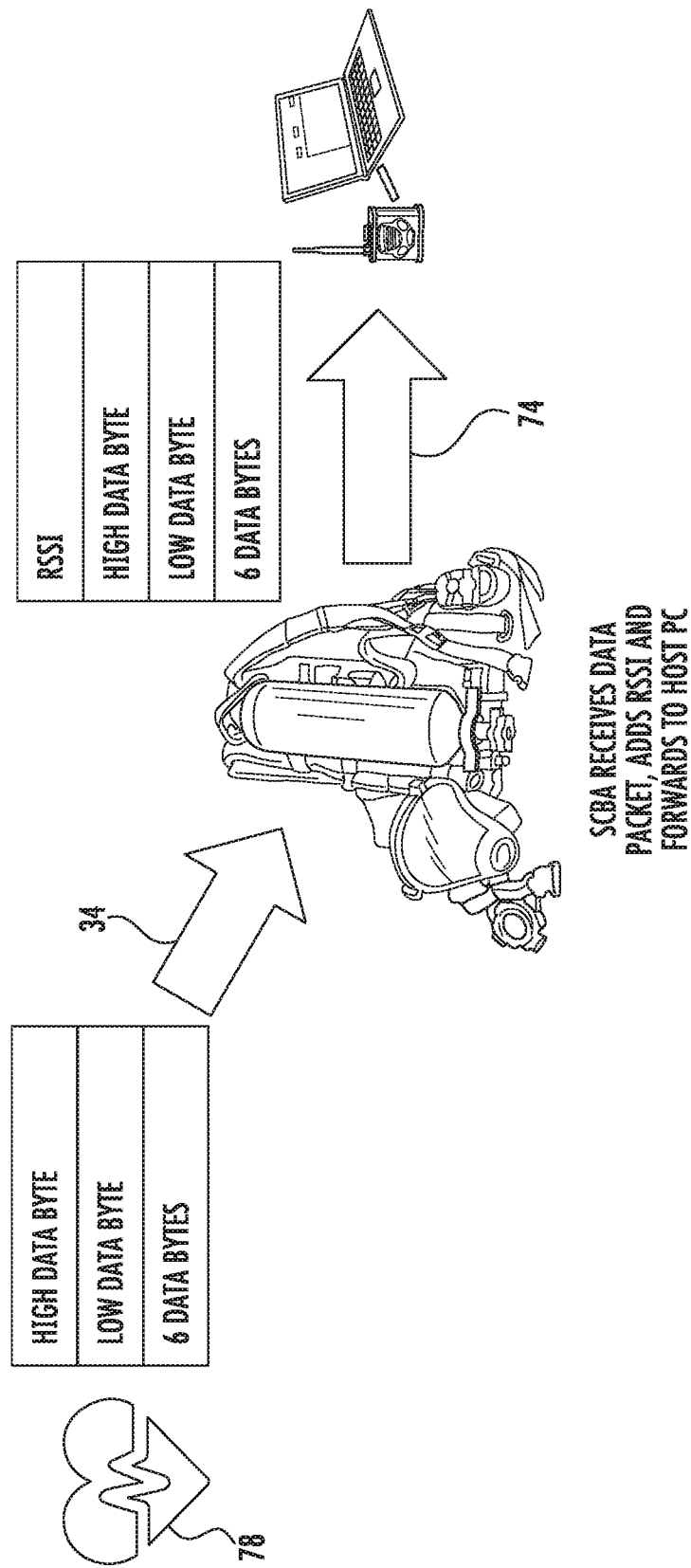
FIG. 7 is a diagrammatic representation of a method for monitoring a plurality of firefighting teams during an emergency incident, according to an embodiment.

Referring now to FIGS. 6 and 7, a safety system 70 can be implemented for a plurality of emergency personnel, such as firefighters 14. In some embodiments, the safety system 70 can include a plurality of wireless communication units 20, with each communication unit 20 assigned to and carried by a specific one of the firefighters 14. The safety system 70 can also include a centralized, incident command monitoring system 22 that is monitored/operated by an incident commander 23 and will typically be located within or nearby an incident command vehicle 24. In some embodiments, each communication unit 20 can include a radio device, e.g., the short-range radio 26 and/or the long-range radio 28.

In some embodiments, each short-range radio 26 can be tuned to have a line-of-sight range of no greater than about 10 feet, about 15 feet, about 20 feet, about 25 feet, about 30 feet, about 35 feet, about 40 feet, about 45 feet, or about 50 feet, inclusive of all values and ranges therebetween. In some embodiments each long-range radio 28 can be tuned to have a line-of-sight range of at least about 100 feet, about 150 feet, about 200 feet, about 250 feet, about 300 feet, about 350 feet, about 400 feet, about 450 feet, or about 500 feet, inclusive of all values and ranges therebetween. It should be understood that in some applications it may be desirable for the line-of-sight range for the short-range radio 26 to be less than or greater than the values and ranges disclosed above and, similarly, for the line-of-sight range of the long-range radio 28 to be less than or greater than the values and ranges disclosed above. The most desirable line-of-sight range for the radios 26 and 28 will often be dictated by the particulars of each application, including, for example, the environment in which it is anticipated the firefighters will be operating, the anticipated spread or distance of each of the firefighters 14 in a team 12 when they are working at an incident, the size of the incident, and the anticipated distance of any firefighting team from the incident command center where the incident commander 23 is located.

In some embodiments, the safety system can also include sensors configured to collect, measure, quantify, or in other ways sense the health of a firefighter 14 and/or environmental conditions around the firefighter 14. For instance, a wireless communication unit 20 can comprise or be connected to a sensor 72 configured to sense a temperature. For instance, the sensor 72 may be configured to sense the air temperature as an indirect indicator of likelihood that the associated firefighter 14 is experiencing a heat-related illnesses or condition. In some embodiments, the sensor 72 may be configured to sense the core temperature of the firefighter 14 as a direct indicator of risk of the firefighter 14 experiencing heat-related illnesses or conditions. In some embodiments, a sensor 74 can be configured to measure or predict, directly or indirectly, a flashover event. Leading up to a flashover event, certain organic materials, when exposed to high heat or fire during the emergency incident, release flammable gases as part of the thermal decomposition of those organic materials. These flammable gases build up within the space, building, or area of the emergency incident, which can lead to a rapid ignition of the flammable gases, which is the flashover event.

In some embodiments, each firefighter 14 carries an SCBA 34, which can be used as a central radio frequency (RF) communications hub for integrating a number of sensors (e.g., 72, 76, 78) integrated into the SCBA 34, carried by the firefighter 14 but separate from the SCBA 34, or located in the vicinity of the firefighter 14. If the SCBA 34 is designed and certified to accept small amounts of RF signal without affecting the core SCBA 34 capabilities, the integration of such sensors 72, 76, 78 will not require costly recertification. Each sensor 72, 76, 78 can contain a unique address that is sent together with a predefined amount of data. The SCBA 34 can be configured to receive sensor data and sensor address and relay the information directly to the incident command monitoring system 22 without further processing. In an alternate embodiment, the SCBA 34 may verify the sensor address is in a predefined range of addresses, minimizing the forwarding of unnecessary data packets. To enable the sensors 72, 76, 78 to operate over long periods of time with minimal power requirements, the sensors 72, 76, 78 can be configured to send minimal data and/or to transmit signals indicative of the sensor data and/or sensor identifier at infrequent intervals. Additionally or alternatively, the sensor 72, 76, 78 can be configured to transmit a signal only and not to receive signals from other sensors. This inhibits any login or registration with the SCBA 34 hub. In some embodiments, each sensor 72, 76, 78 may transmit only a small amount of sensor data (e.g., between about 1 byte and about 10 bytes), each sensor 72, 76, 78 having a unique device address. The SCBA 34 receives this information not knowing the type of device but relays the information together with the signal strength of the received RF message to an external host processor, e.g., 56. Each device will be registered with the host processor with its unique device address. When the host processor 56 receives the unique device address, sensor data, and signal strength, the host processor 56 can be configured to determine the type of device, the contents of the sensor data (temperature, pressure, biometric data, etc.) as well as the distance the sensor is from the firefighter. Using multiple sensors either attached to or carried by the firefighter 14 or distributed in the vicinity of the firefighter 14, the incident commander 23 or the processor 56 is able to determine attributes and risk levels of the environment and, when the sensors are placed at a precise location, the estimated, approximate, or actual location of the firefighter 14 using the signal strength. As illustrated, the sensors 72, 76, 78 can be configured to measure ambient temperature, flammable gas concentration as a predictor of a flashover event, and firefighter 14 biometric data, respectively, however, other sensors can be used to collect or measure other characteristics, traits, metrics, data, materials, conditions, or other aspects of the emergency response area nearby the firefighter 14 without limitation. Regardless of the type of information collected, the type of sensor, where the sensor is located with respect to the firefighter 14, and/or the intermittent rate of collection/transmission of such data, such collected or measured data can be transmitted as a signal from the sensor or sensors to a RF hub such as the SCBA 34, which can be used to monitor the well-being of the firefighter 14 and alert the incident commander 23 to any potentially dangerous conditions or at-risk firefighters 14 during emergency response.

For example, as illustrated in FIG. 7, a sensor 78 can be configured to measure or otherwise collect biometric data about a firefighter 14 or a plurality of firefighters 14. The sensor 78 can be configured to transmit a signal to the SCBA 34 or another such RF hub (e.g., 20) configured to receive and transmit long-range and/or short-range RF signals. The biometric data collected can include any physiological characteristic of the firefighter 14 that can be used to identify the firefighter 14, estimate, calculate, or infer a health characteristic of the firefighter 14, identify a change in a health characteristic of the firefighter 14 over time, identify a change in a health characteristic of the firefighter 14 in response to a particular event, environmental condition, or the like. In some embodiments, the sensor 78 can be configured to measure the core body temperature of the firefighter 14. In some embodiments, the sensor 78 can be configured to measure the heart rate of the firefighter 14. In some embodiments, the sensor 78 can be configured to measure the blood pressure of the firefighter 14. In some embodiments, the sensor 78 can be configured to measure the rate of perspiration of the firefighter 14. In some embodiments, the sensor 78 can be configured to measure the concentration of electrolytes in the firefighter's 14 perspiration or other bodily fluids. In some embodiments, the sensor 78 can be configured to measure the respiration rate of the firefighter 14. The sensor 78 can be configured to measure or otherwise collect any other physiological characteristic of the firefighter 14.

In some embodiments, the RF hub, e.g., the SCBA 34, can be configured to receive the signal from the sensor 78 and identify from the signal strength, based upon a known initial strength of the signal sent by the sensor 78, the approximate distance of the sensor 78 from the SCBA 34. This approximate distance can be called the received signal strength indicator (RSSI), and the SBCA 20 or a component (e.g., communication unit 20) thereof, can add the RSSI information to the signal and transmit 74 the signal (e.g., via the long-range radio) to the incident command monitoring system 22. Alternatively, the SCBA 34 can transmit 74 the sensor signal to the incident command monitoring system 22 without adding the RSSI information.

Each communication unit 20 will further include a processor operably connected to the short-range radio and the long-range radio and to a memory to allow the processor to send control signals to each of the radios and, to receive signals from each of the radios and, and to store and receive data into and out of the memory. Although it is not shown, each communication unit will also include a power source, such as a suitable battery.

Figure 8:
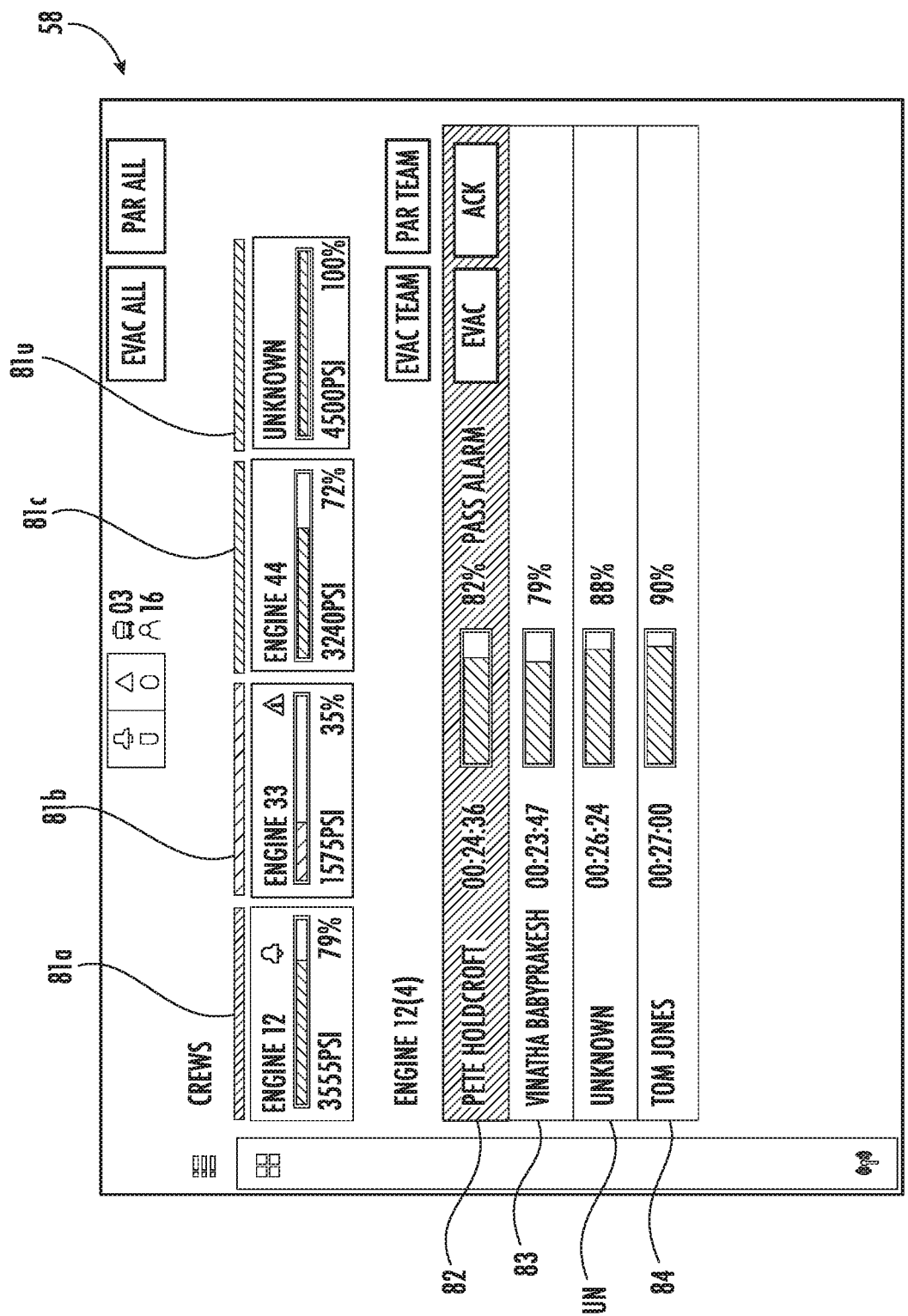
FIG. 8 is a view of a user display of the incident command monitoring system, according to an embodiment.
Figure 9:
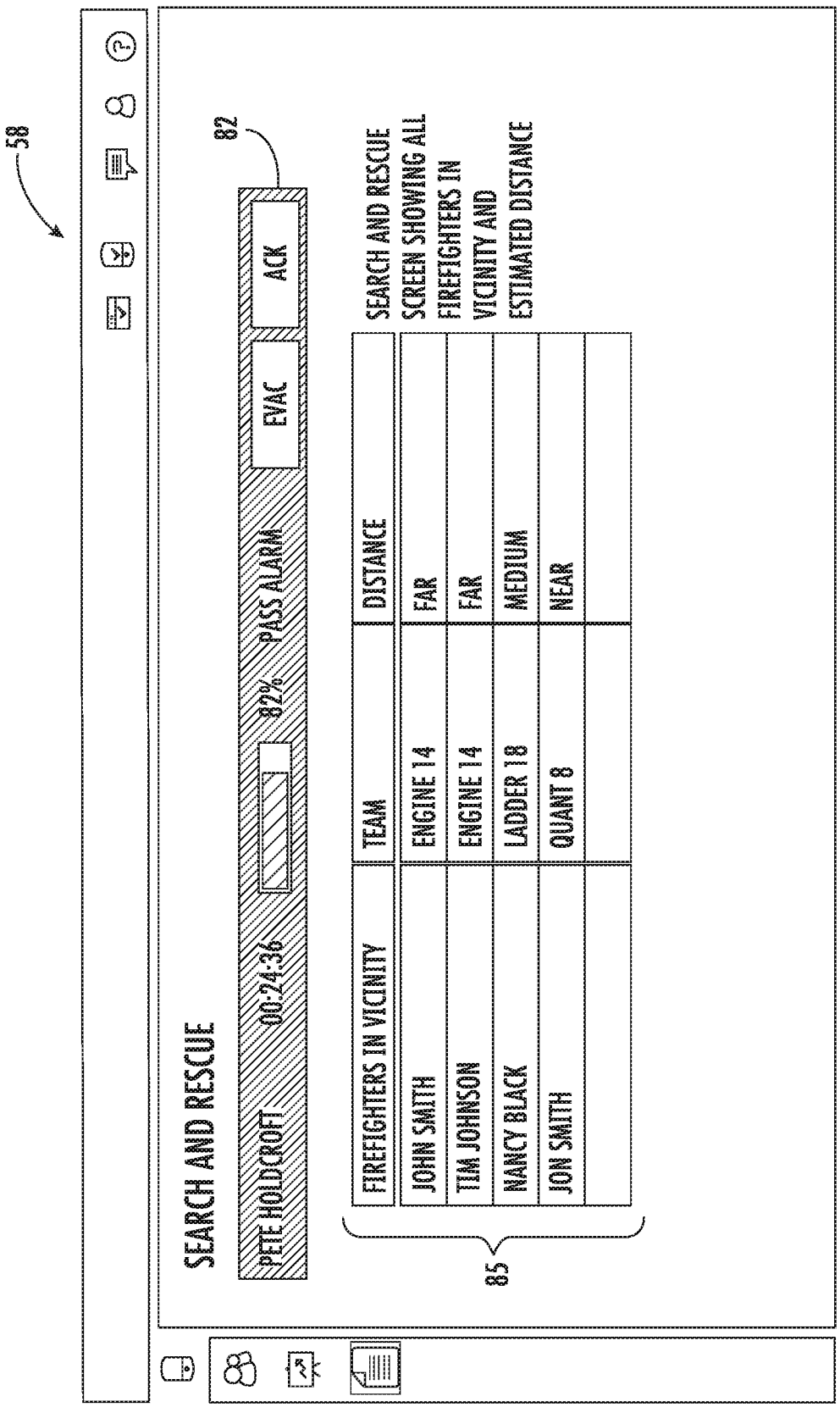
FIG. 9 is a view of a user display of the incident command monitoring system, according to an embodiment.

Referring now to FIGS. 8 and 9, in some embodiments, each firefighter 14 can be equipped with an SCBA 34 that includes or is operably coupled to a long-range radio that is configured to send a signal indicative of a compressed breathing air level within an air tank of the SCBA 34 and/or any alarm conditions to the incident command monitoring system 22. In addition, each SCBA 34 can include a short range radio configured to transmit and/or receive any suitable signal protocol (e.g., RF, infrared radiation, Bluetooth, etc.). The short range radio can be configured to continuously transmit an identification number or unique identifier as well as the identification number or unique identifier for the SCBA 34 or CU 20 other firefighters 14 in the vicinity. Using the signal strength of beacons received, an estimated distance can also be derived. This association and distance information for each firefighter is sent to the IC computer which constructs an association graph of the physical co-location for each firefighter 14. If a firefighter 14 becomes disoriented, injured, or lost and signals the IC, the IC will immediately have information on the other members of the team 12 that are nearby. Should the firefighter 14 suddenly become separated from the other members of the team 12 as a result for example of falling through a floor, the last known location of the fallen firefighter 14 can be established.

Figure 10:
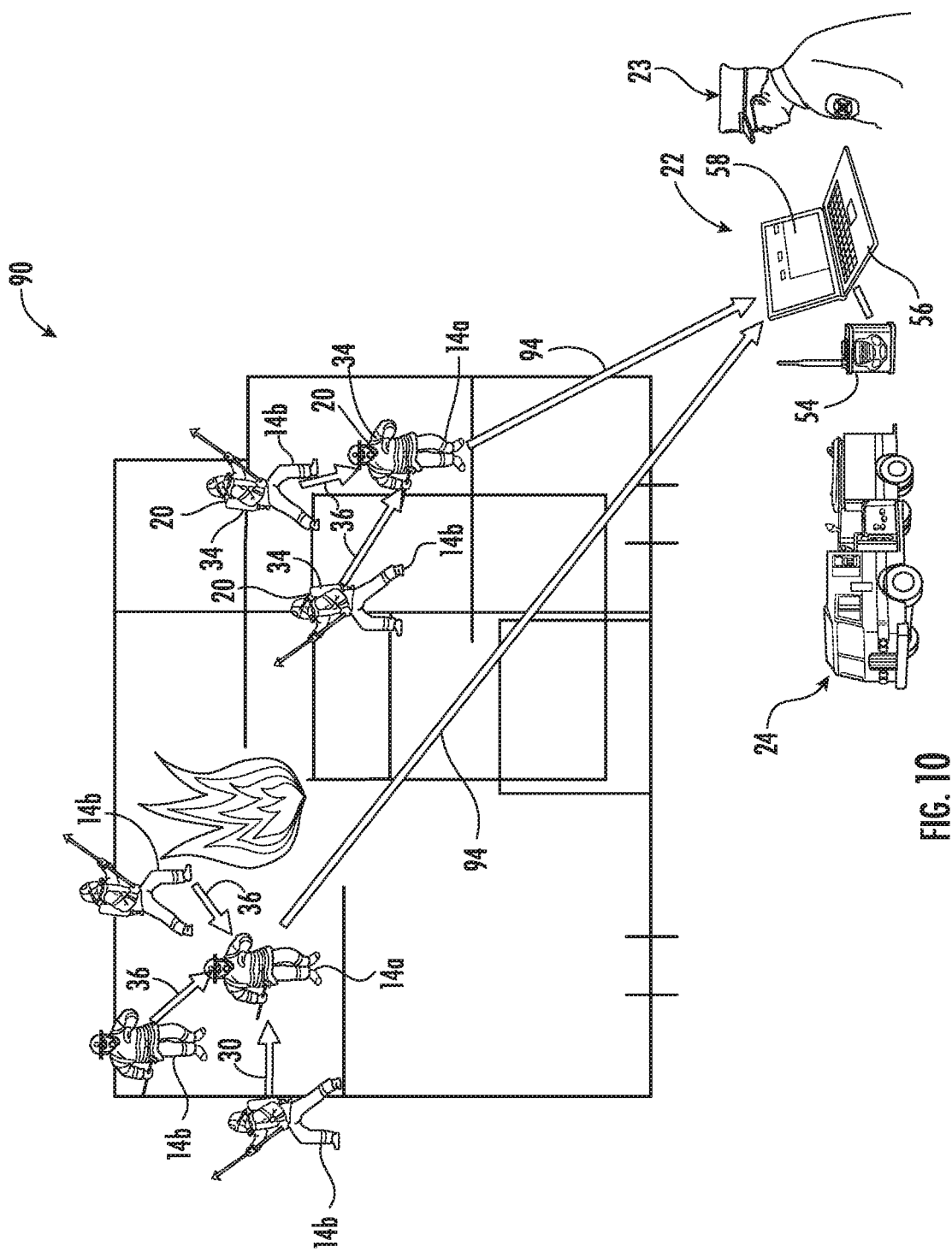
FIG. 10 is a diagrammatic representation of a safety system for monitoring a plurality of firefighting teams during an emergency incident, according to an embodiment.
Figure 11:
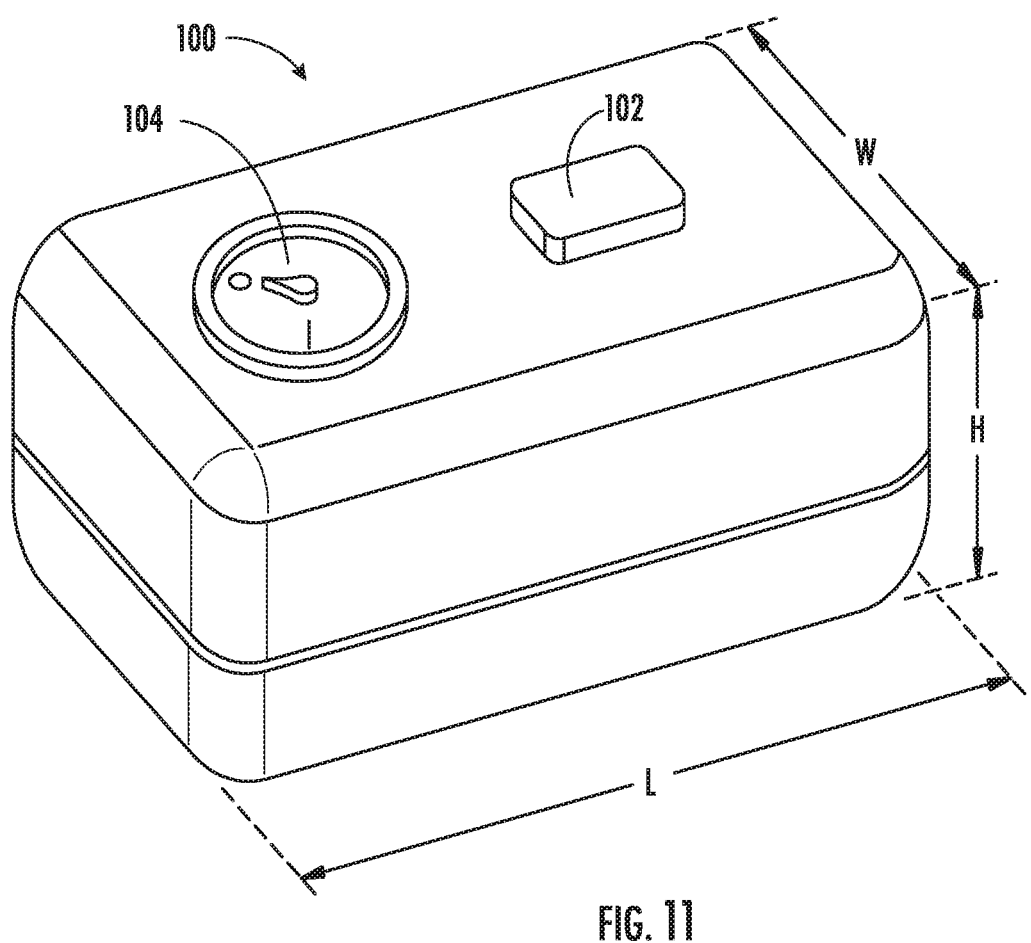
FIG. 11 is a schematic illustration of an RF beacon, according to an embodiment.
Figure 2:
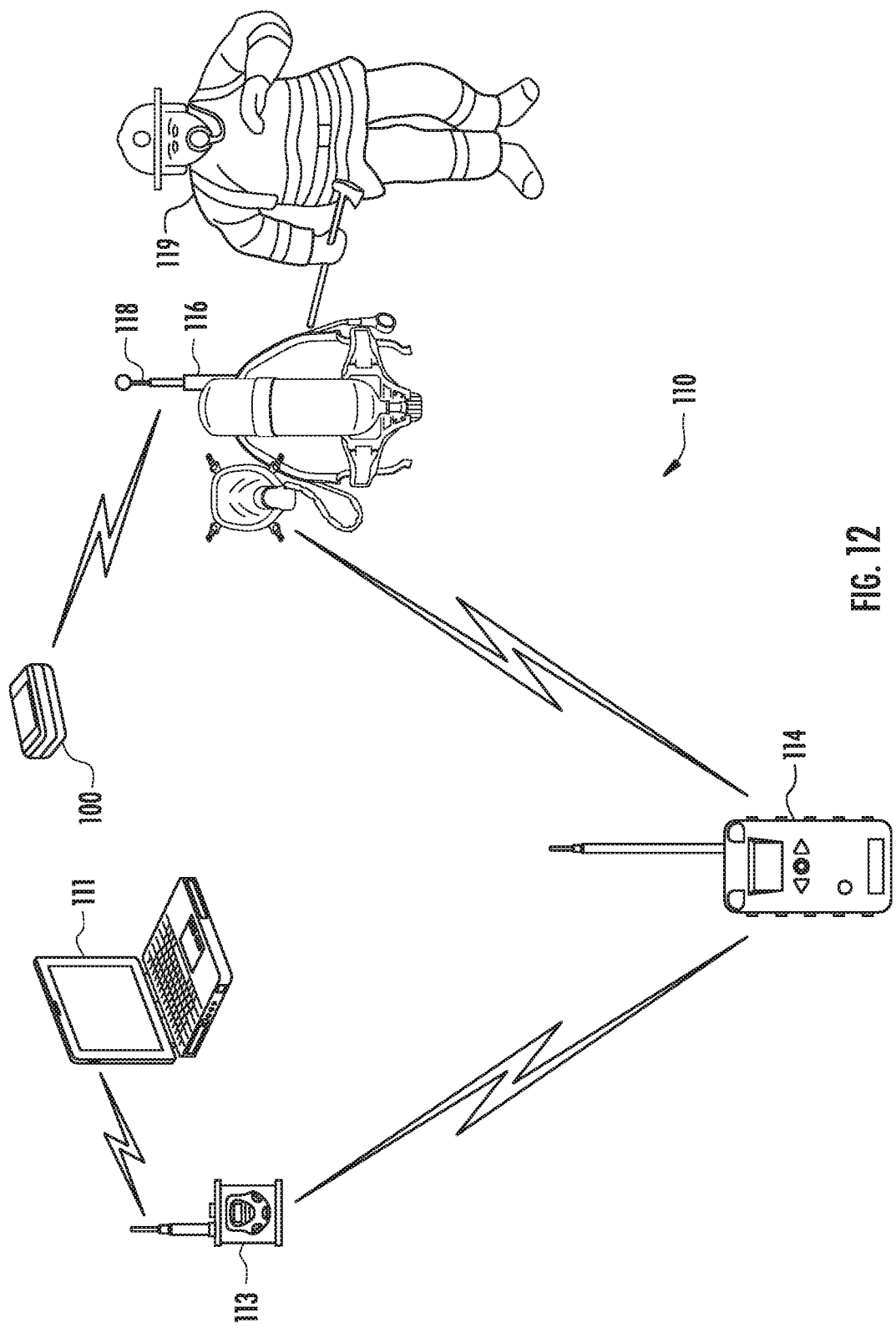

During search and rescue operations, when a search team comes into the vicinity of the lost firefighter 14, their SCBA 34 radios will detect the presence of the lost firefighter 14 by receiving signal(s) from the lost firefighter's 14 radio, limiting the size of the search area. Using signal strength, the distance to each of the nearby firefighters 14 can be estimated, allowing the IC 23 or the incident command monitoring system 22 to quickly identify the nearest persons that are able to render assistance. Furthermore, combining the distances from all the firefighters 14 whose signal has been sent to the incident commander 23 or the incident command monitoring system 22, is suitable to triangulate an estimated area for the location of the downed or lost firefighter 14. In some embodiments, the long-range transmission of signal to the incident commander 23 or the incident command monitoring system 22 can be carried out by a Bluetooth low energy beacon 94, as illustrated in FIG. 10.

In some embodiments, the incident command monitoring system 22 can include a processor 56 and a display 58, the display configured to display a user interface comprising a listing of the various engines, crews, or teams of emergency personnel working in the emergency response area. For instance, as illustrated in FIG. 8, the display 58 can display a series of tabs associated with different engines, e.g., tabs 81a, 81b, and 81c associated with engines 12, 33, and 44) known to be operating within the area. In some embodiments, a tab 81u can be associated with an unknown engine, crew, or team working in the area. The display 58 can further include a listing for each, engine or crew or team, of the particular emergency personnel working in the team (e.g., 82, 83, and 84). In some embodiments, the listing can include information related to the name and/or unique identifier of firefighters 14, the duration of firefighter 14 deployment within the incident response area, the remaining quantity of breathing air for each firefighter 14, alerts such as personal alert safety system (PASS) alerts and alerts associated with sensors 72, 76, 78, team association, and other such related information. As illustrated in FIG. 9, when an alarm 82 is provided for a particular firefighter 14, the processor 56 can be configured to identify and cause the display 58 to display a list of available search and rescue personnel 85 in the vicinity of the firefighter 14 for which an alarm 82 was received and displayed. In some embodiments, the list of available search and rescue personnel 85 can comprise a list of firefighters 14 or other emergency personnel active within the emergency response area. This list 85 can be developed by identifying, e.g., using the processor 56, the firefighters 14 that have CUs 20 which have received the unique identifier of the CU 20 of the firefighter 14 for which the alarm 82 was raised. In some embodiments, the list 85 can be sorted according to current or last-available proximity to the downed firefighter 14, by a gradient or metric for the members of the list 85 associated with their respective availability in terms of difficult of task, over-allocation of personnel to particular nearby teams 12, etc.

Embodiments of the disclosure may provide a simple-to-deploy system for identifying key regions and providing automated information on the time and last known position for accountability and directing search and rescue operations. Firefighter or emergency workers may carry portable systems (e.g., SCBA 34) that can include a low cost, low power radio frequency ("RF") transceiver. These simple, disposable, low cost RF beacons may be provided to key members of a firefighting team, as they enter and move around a structure. At key points inside or outside the structure, the firefighters may take one of the RF beacons, activate the RF beacon (e.g., by turning dial 104, etc.), and mount it to a surrounding structure. Upon activating the RF beacon, the RF beacon may begin transmitting a signal (e.g., wireless) providing its identification and/or location. The RF beacon may have a simple mounting mechanism (e.g., screws, bolts, straps, adhesive, or combinations thereof) to allow mounting of the RF beacon on many internal or external structures, such as, for example, a wall, door, siding, tree, telephone pole, etc. When a firefighter activates and attaches the RF beacon to a surrounding structure, the firefighter may also contact the incident commander and indicate the location of the RF beacon and verify its correct operation. The incident commander may maintain a map containing the locations of all of the RF beacons deployed, or list the location of each of the RF beacons using software integrated to an incident commander (e.g., a computer). Since the signal for the RF beacon may not travel significant distances; when a subsequent firefighters pass through the same vicinity, their portable systems may detect the RF beacon and may relay the identification of the RF beacon back to the incident commander. Since the RF signal may travel a short distance, the incident commander can precisely note the place and time the firefighter was at that location associated with the specific RF beacon. Additional uses of the RF beacons may include mounting the RF beacons on rocks or heavy objects that can be thrown into a structure. If the RF beacon is thrown into the vicinity of a lost firefighter, the relay of the RF beacon identification can be used to confirm the firefighter's position.

Referring now to FIGS. 11-16, an RF beacon 100 may include an RF module 102 configured to communicate via radio frequencies. The RF beacon 100 may also include dial 104 for turning the RF beacon 100 on/off. The RF beacon 100 may have a length, L, from about 1.5 inches to about 3 inches; a width, W, from about 1 inch to about 2 inches; and a height from about 0.5 inch to about 1 inch. The RF beacon 100 may be of any suitable shape, such as, for example, a polyhedron (e.g., cube, rectangular prism, a triangular prism). The RF beacon 100 may operate using a battery having a suitable voltage (e.g., a 3 volt battery, etc.) and may be waterproof and/or heat resistant up to about 600° F. The RF beacon 100 may be constructed in a minimally insulated package allowing it to survive for a short time period in a fire situation in order to transmit signals that can be relayed (e.g., through a portable device, etc.) back to an incident commander (e.g., incident commander 112 shown on FIG. 12).

The RF beacon 100 may be a low power radio/battery combination that may use one of many wireless protocols, such as, for example, low power protocols such as Bluetooth Low Energy ("BLE"), low power wide area network ("LP-WAN"), 802.15.4, or combinations thereof. Turning dial 104 to an ON position may cause the RF beacon 100 to start transmitting a signal including information, such as, for example, a unique identifier, the RF beacon 100's location (e.g., a regional location, room identifier, site location, etc.), last location a firefighter was detected, and/or current time. This signal may be immediately received by the firefighter's portable device 116 mounted telemetry module (e.g., a SCBA 34 mounted telemetry module shown on FIG. 12, a safety communicator comprising a portable communication device capable of using cellular communication protocols, etc.) and relayed to the incident commander. In some embodiments, data can be transmitted from the portable device to the RF beacon to be stored. For example, a location estimate, or any of the other information listed herein, provided by the portable device can be provided to the RF beacon, which can then be transmitted as part of the RF beacon transmission.

Using a voice radio or other digital means, the user may indicate an area the RF beacon 100 has been mounted in. For example, a notification at the time the RF beacon is deployed can communicate the latest location determination of the portable device, which may be reasonably close to the location of the RF beacon 100 to serve as the location estimate. Subsequent firefighters coming into the same vicinity may detect the RF beacon 100 with their respective portable devices and relay information received from the RF beacon 100 to the incident commander. The transmitted information including the unique identifier, the RF beacon 100's location, a last location a firefighter was detected, and/or current time may be logged by the incident commander.

The RF beacon 100 may be utilized as a location marker. That is, at key points inside or outside a structure (e.g., a building), a user (e.g., an emergency responder such as a firefighter) may take the RF beacon 100, activate the RF beacon 100 by turning dial 104 to an ON position, and attaching/mounting/positioning the RF beacon 100 on a surrounding structure (e.g., wall, floor, ceiling, furniture) within a building. The dial 104 may be graspable by gloved hands (e.g., insulated gloves substantially larger than a human hand, such as firefighter gloves). Upon activating the RF beacon 100, the RF beacon 100 may begin transmitting, a signal including information, such as, for example, a unique identifier, the RF beacon 100's location (e.g., regional location), last location (e.g., regional location) a firefighter was detected, and/or current time. The RF beacon 100 may include a simple mounting mechanism (e.g., screws, bolts, straps, adhesive, or combinations thereof) to allow mounting of RF beacon 100 on many internal and/or external structures, such as, for example, a wall, door, siding, tree, telephone pole, etc. The RF beacon 100 may also be placed/attached to vehicles (e.g., a fire truck) to identify a recovery area, nearness to trucks, etc. The RF beacon 100 may indicate that a user is outside of a structure or inside a structure based on signal strength between the RF beacon 100 and portable device 116. When a firefighter activates and attaches the RF beacon 100 to a structure, the firefighter may also contact an incident commander (e.g., a computer system for monitoring RF beacon(s) 100 and processing information received from RF beacon(s) 100) and provide a description of the location of the RF beacon 100 and verify that the RF beacon 100 is operating correctly. The incident commander may maintain a map containing the locations/positions of the RF beacons 100 deployed, or list the location of each RF beacon 100 by using software integrated to incident commander 112. Since signals from/to the RF beacon 100 may not travel significant distances (e.g., up to about 30 feet), when subsequent firefighters pass through the same vicinity, their portable device 116 may detect the RF beacon 100 and relay information including the unique identifier, the RF beacon 100's location (e.g., regional location), last location (e.g., regional location) a firefighter was detected, and/or current time to incident commander 112. Since the RF signal may travel a short distance, incident commander 112 can precisely or approximately note the place and time each firefighter was at that location. Additional uses of the RF beacons 100 may include mounting the RF beacons 100 on rocks or heavy objects that can be thrown into a structure. If the RF beacon 100 is activated and thrown/deployed into the vicinity of a lost firefighter, confirmation of the firefighter's position can be established. That is, the RF beacon 100 may be thrown into, for example, windows where a lost firefighter is thought to be, and may indicate a presence of the lost firefighter based on signal strength between RF beacon 100 and a portable device 116. Signal strength may indicate whether a firefighter is located at a near distance, a medium distance, or a far distance from the RF beacon 100. The RF beacon 100 may contain a color code wheel numbering system to allow the incident commander to identify the locations of the RF beacon(s) 100.

FIG. 12 illustrates a breadcrumb telemetry system 110. Breadcrumb telemetry system 110 may include incident commander 112, an optional RF relay station 114, the RF beacon 100 (bread-crumb), and a portable device 116. A wireless protocol, such as, for example, BLE, low power wide area network ("LPWAN"), 802.15.4, or combinations thereof, may be a communication protocol for communication between RF beacon 100 and portable device 116. A wireless protocol, such as, for example, a long range radio may be a communication protocol for communication among the RF relay station 114, the portable device 116, and the incident commander 112.

The incident commander 112 may include a computer system for monitoring the RF beacon(s) 100 and processing information received from the RF beacon(s) 100 and communication module 113 (e.g., long range radio). The incident commander 112 may be manned or unmanned. The RF relay station 114 may be an optional component of breadcrumb telemetry system 110. The RF relay station(s) 114 may be deployed as needed to increase a communication range between incident commander 112 and the portable device 116. The portable device 116 may include long range (e.g., up to about 20 miles) radio 118, and may relay information (e.g., a unique identifier, the RF beacon 100's location (e.g., regional location), last location (e.g., regional location) a firefighter was detected, and/or current time) it receives from the RF beacon 100 to the RF relay station 114 which may relay the information to incident commander 112. For example, the RF relay station 114 may be a long range radio configured to relay a signal up to about 20 miles. Alternatively, portable device 116 may transmit the information directly to incident commander 112. The portable device 116 may be worn by an emergency responder, such as, for example, firefighter 119.

Figure 13:
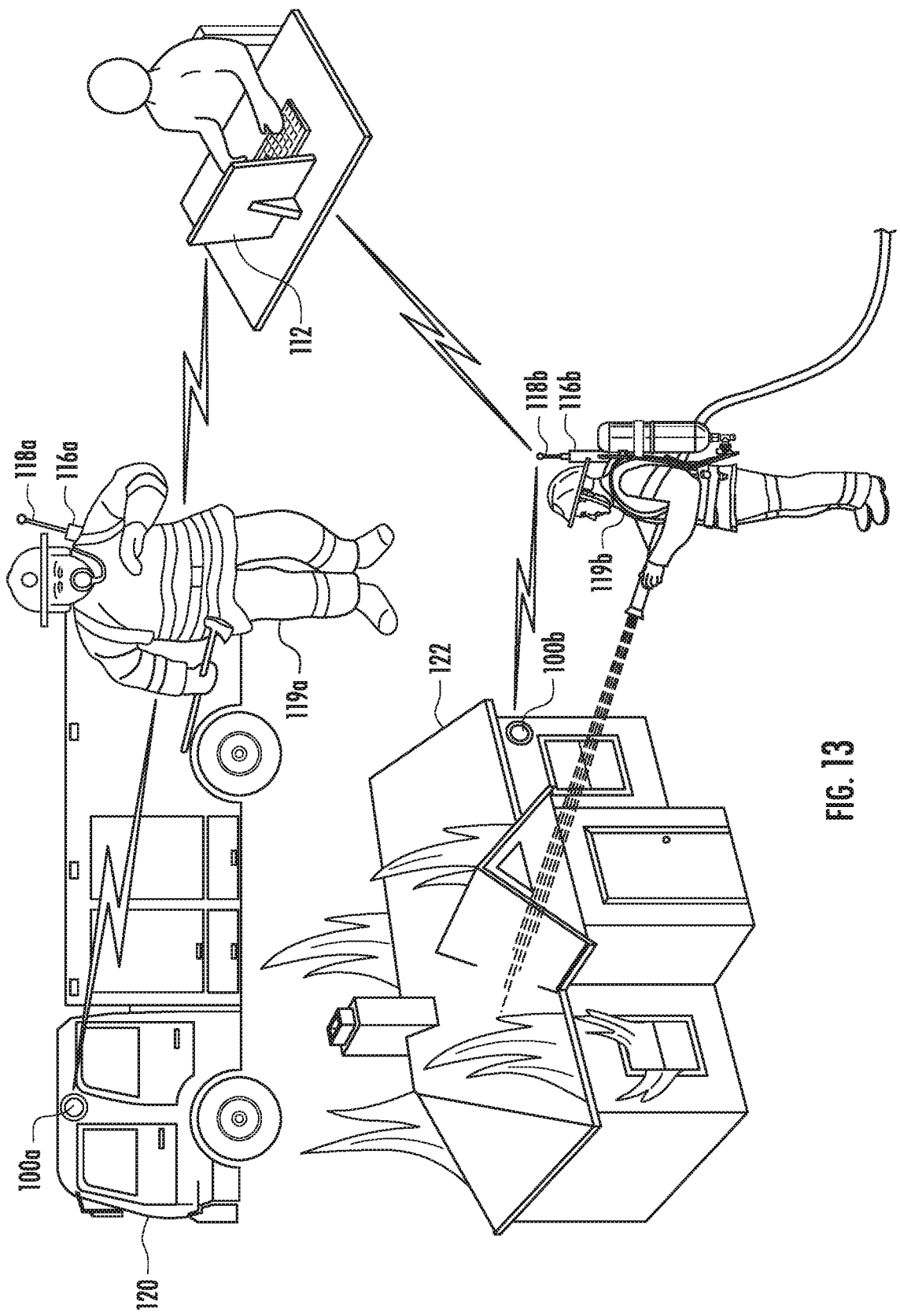
FIG. 13 is a schematic illustration of an RF beacon positioned on an emergency vehicle, according to an embodiment.

FIG. 13 illustrates an RF beacon 100a positioned on an emergency vehicle (e.g., fire truck 120), and an RF beacon 100b positioned on structure 122. The RF beacon 100a may be activated by firefighter 119a and placed on fire truck 120. The firefighter 119a may then notify (e.g., via radio, cell phone) the incident commander 112 of the location of the RF beacon 100a (e.g., describing that the RF beacon 100a is positioned on fire truck 120). The RF beacon 100a may transmit information including a unique identifier, RF beacon 100a's location (e.g., regional location), last location (e.g., regional location) firefighter 119a was detected, and/or current time, to portable device 116a which may relay the information to incident commander 112 via radio 118a.

The firefighter 119b may activate the RF beacon 100b and place it on structure 122. The firefighter 119b may then notify (e.g., via radio, cell phone) incident commander 112 of the location of the RF beacon 100b (e.g., describing that the RF beacon 100b is positioned on structure 122, relaying the firefighter's 119b current location, etc.). The RF beacon 100b may transmit information including a unique identifier, the RF beacon 100b's location (e.g., regional location), last location (e.g., regional location) firefighter 119b was detected, and/or current time, to portable device 116b which may relay the information to incident commander 112 via radio 118b.

Figure 14:
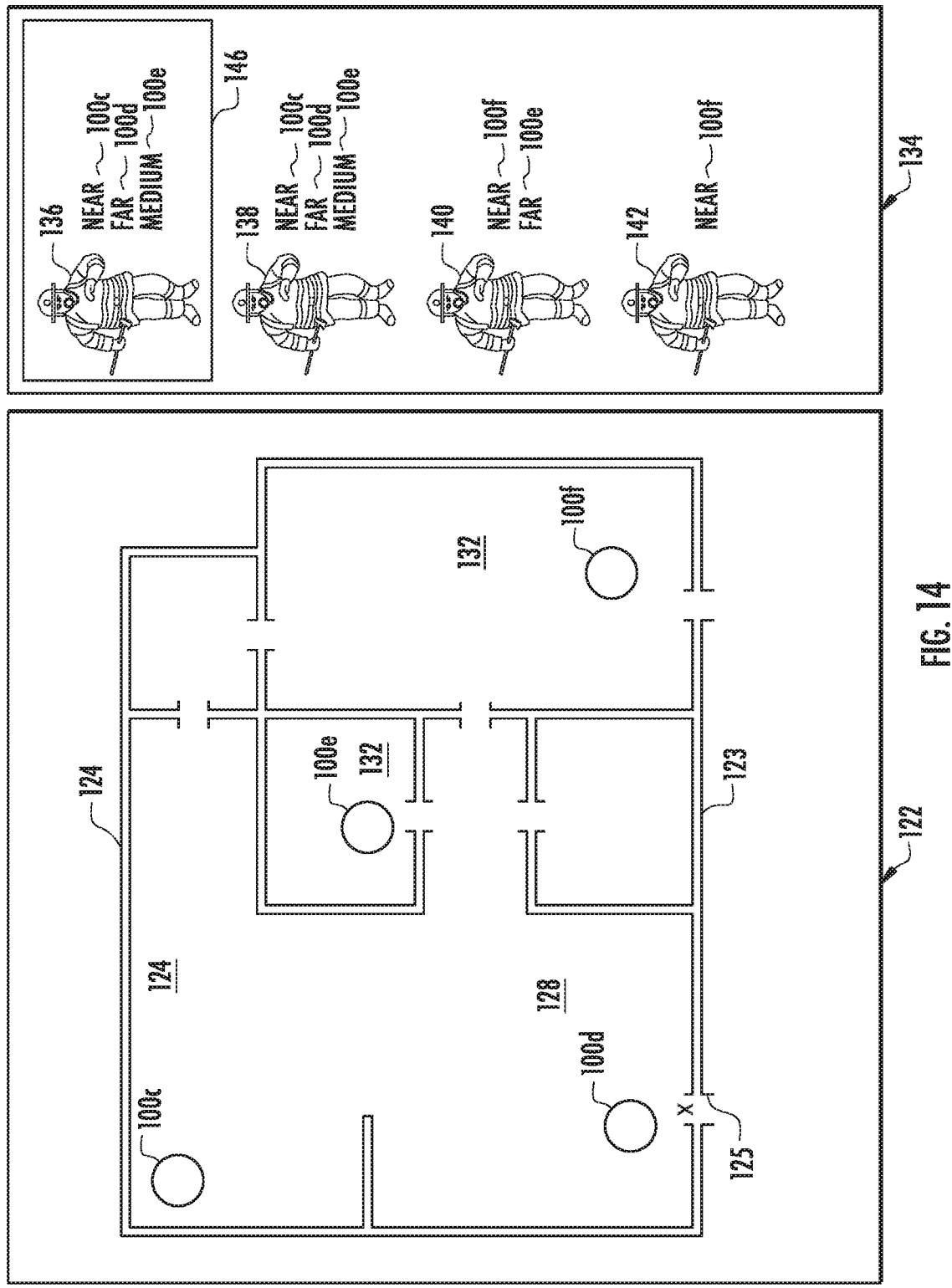
FIG. 14 is a schematic illustration of a user interface, according to an embodiment.

FIG. 14 illustrates user interface 122 for incident commander 112. The user interface 122 may allow for rapid identification and selection of all of the personnel (e.g., firefighters 136, 138, 140, and 142) in the vicinity, and display annotations (e.g., markers) tracking the movement of the personnel (e.g., emergency responders). The incident commander 112 may draw floor plans 124 of structure 123 using location descriptions provided by a firefighter and/or the information provided by the RF beacons 100c-100f and display floor plans 124 in user interface 122. The floor plans 124 may include a map of the placement/location of each of the RF beacons 100c-100f. As illustrated in FIG. 14, a firefighter may enter structure 123 via entrance 125, activate the RF beacons 100c-100f, and place the RF beacon 100c in area 126 (e.g., room, stairwell, or hallway), place 100d in area 128, place 100e in area 130, and place 100f in area 132. The firefighter may then contact the incident commander 112 and describe the regional placement/location of each of the RF beacons 100c-100f relative to internal structures, such as, for example, stairs, hallways, rooms, closets, doors, entrance 125, exit, structure level (e.g., second floor or first floor), elevators, furniture, etc. The incident commander 112 may then create/draw floor plans 124 based on the regional placement descriptions communicated to incident commander 112 by the firefighter. The panel 134 of the user interface 122 may show each firefighter (e.g., firefighter 136, firefighter 138, firefighter 140, firefighter 142) within structure 123. The panel 134 may also show the signal strength between each of the RF beacons 100c-100f and a portable device 116. The signal strength between the RF beacons 100c-100f and a portable device 116 (shown in FIG. 12) may indicate whether a firefighter (i.e., a firefighter wearing portable device 116) is located at a near distance, a medium distance, or a far distance from each of the RF beacons 100c-100f, as shown in panel 134. The signal strength may be calculated by incident commander 112 with a triangulation algorithm. Specific values for distances may depend upon building materials and/or the layout of structure 123.

Figure 15:
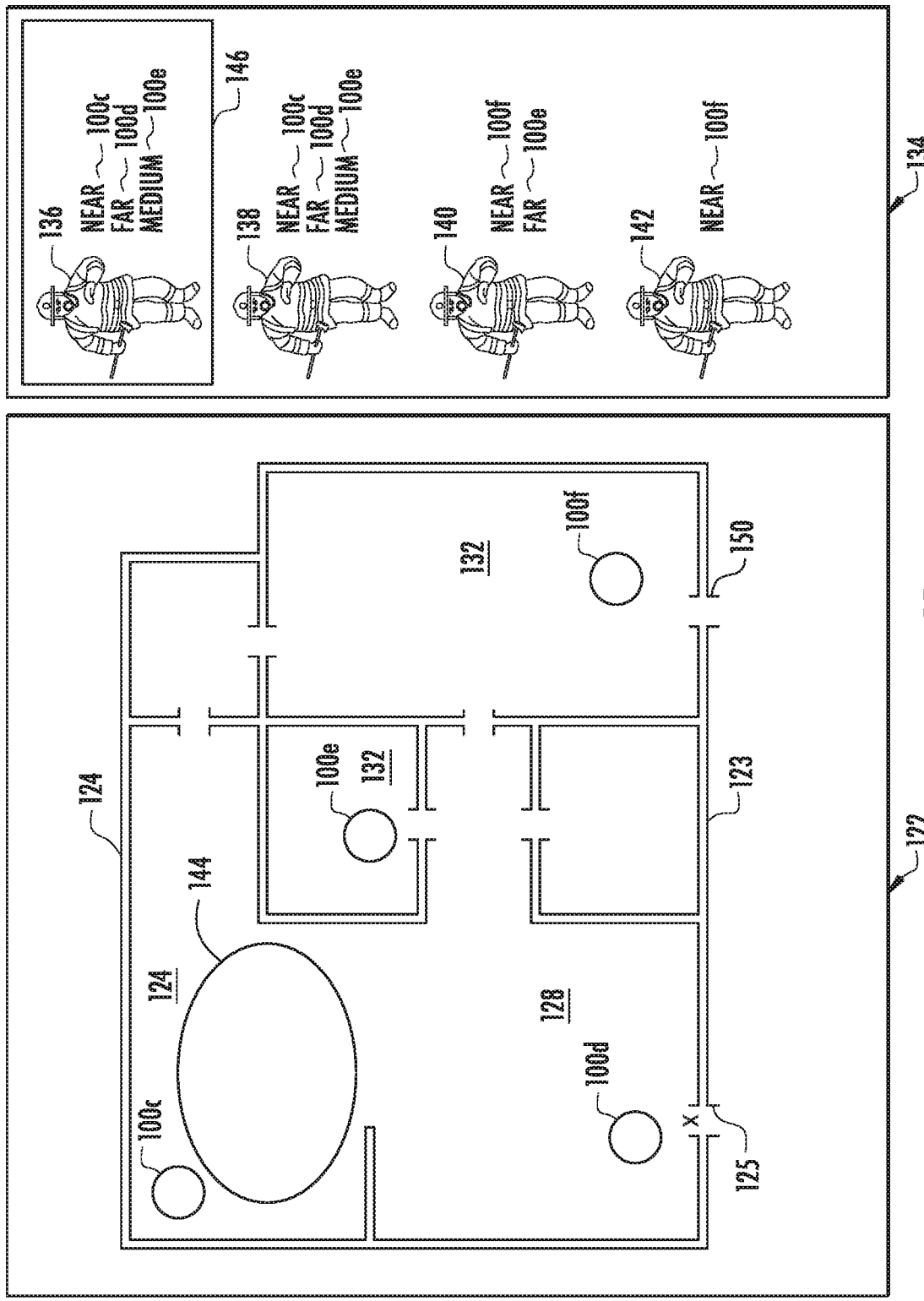
FIG. 15 is a schematic illustration of a user interface showing an estimated region of an emergency responder, according to an embodiment.

FIG. 15 illustrates user interface 122 showing an estimated region or vicinity 144 of firefighter 136. The user interface 122 may select/highlight (e.g., box 146) a firefighter (e.g., firefighter 136) from a plurality of firefighters (e.g., firefighters 136, 138, 140, and 142) shown in panel 134 when displaying an estimated region (e.g., vicinity 144) for that particular firefighter. The signal strength between the RF beacons 100c-100f and a portable device 116 (shown on FIG. 2) may indicate a vicinity (e.g., vicinity 144) where each firefighter may be located/positioned. The vicinity 144 may be shown with a circular graphic. The vicinity of each firefighter may be calculated by incident commander 112 with a triangulation algorithm.

During use, the signals detected by the firefighters from the RF beacon(s) can be transmitted back to the incident commander, where the signals can be detected and stored along with various identification information for the firefighters as well as a time stamp. Upon passing by a plurality of RF beacons, a path can be detected for each firefighter such that the relative locations and timings of the firefighters can be traced. This may allow other firefighters to follow a lead firefighter, or the firefighters position to be tracked over time.

FIG. 16 illustrates exit route 148 in user interface 122 based on the positions of the RF beacons 100c-100f. The incident commander 112 may draw an exit route 148 in user interface 122 for firefighters 136, 138, 140, and/or 142 within structure 123, and direct firefighters 136, 138, 140, and/or 142 to exit 150 based on signal strength between a portable device 116 of each of firefighters 136, 138, 140, 142, and the RF beacons 100c-100f. The incident commander 112 may also direct (e.g., via radio) each of the firefighters 136, 138, 140, and/or 142 to exit 150 based on the descriptions of the locations of each of the RF beacons 100c-100f. That is, as previously mentioned, each of the firefighters 136, 138, 140, and/or 142 may have communicated to incident commander 112, a description of the location of each of the RF beacons 100c-100f during activation and positioning of RF beacons 100c-100f. The positions can then be used to locate and direct the firefighters to a position such as an exit, or the location of a firefighter who is in trouble or is injured.

It should be appreciated that while specific embodiments are disclosed in this application, the application anticipates other forms for the method and system 10. For example, while the disclosed embodiments of the central monitoring system 22 have been shown in the form of a personal computer, other suitable electronic processing systems may be utilized, including processing systems that are located remote from an incident and that are provided the data packets 38 from the long-range radios 28 and/or the databases 52 and 55 via a "repeater radio", cloud-based communication system, or other suitable long distance communication system. Similarly, while certain methods have been described for allowing the central processor 56 to determine if a firefighter 14 is "misconnected" or "disconnected", any suitable algorithm or method can be utilized. Furthermore, in some systems it may be desired for the central processor 56 to analyze several samples of received data packets 38 to confirm that the firefighter 14 is actually misconnected or disconnected before the central processor 56 commands the display 58 to provide a visual indication that the specific firefighter 14 is misconnected or disconnected. Accordingly, no limitations to a specific structure or embodiment is intended unless expressly recited in an appended claim.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A monitoring system comprising:
a memory containing a database of unique identifications and team assignments for respective persons of a plurality of persons,
wherein each unique identification is associated with at least one communication unit of a plurality of communication units carried by a specific person of the plurality of persons deployed to a site;
a receiver configured to:
  receive a first data packet, from the at least one communication unit carried by a first person of the plurality of persons,
    wherein the first data packet comprising a unique identification of the at least one communication unit, and a unique identification of at least one another communication unit carried by a second person, of the plurality of persons, associated with a first team; and
  receive a second data packet, from the at least one communication unit carried by the first person; wherein the second data packet comprising the unique identification of the at least one communication unit and lacking the unique identification of the at least one another communication unit carried by the second person;
a processor configured to cause provision of a notification upon receiving the second data packet from the first person.

2. The monitoring system of claim 1, wherein the processor is further configured to identify whether one or more person of said plurality of persons is not connected to any other person or any team.

3. The monitoring system of claim 1, further comprising:
a display, wherein the display is configured to provide a visual representation of each person associated with each team and to provide a visual indicator of any person whose unique indication has not been received in any of the data packets.

4. The monitoring system of claim 1, wherein the processor is configured to periodically receive signals indicative of biometric data corresponding to each person, wherein a biometric data includes a core body temperature of the person, a heart rate of the person, a blood pressure of the person, a rate of perspiration of the person, a concentration of electrolytes in a fluid of the person, a respiration rate of the person, or combinations thereof.

5. The monitoring system of claim 1, wherein the processor is configured to periodically receive one or more other signals associated with one or more sensors on said site, the one or more signals indicative of an environmental metric, wherein the environmental metric includes a temperature of an atmosphere surrounding the one or more sensors or a concentration of a flammable gas in the atmosphere surrounding the one or more sensors.

6. A method for monitoring a plurality of persons assigned to one of a plurality of teams, the method comprising:
receiving, by a receiver of a monitoring system, a first data packet, from a first person of the plurality of persons, comprising a unique identification of the first person associated with at least one communication unit of a plurality of communication units carried by a specific person of the plurality of persons deployed to a site;
in an instance in which a processor of the monitoring system receives a first data packet from the at least one communication unit carried by a first person of the plurality of persons,
wherein the first data packet comprises a unique identification of the at least one communication unit and a unique identification of at least one another communication unit carried by a second person of the plurality of persons associated with a first team of the plurality of teams;
receiving a second data packet, from the at least one communication unit carried by the first person; wherein the second data packet comprising the unique identification of the at least one communication unit and lacking the unique identification of the at least one another communication unit carried by the second person; and
generating a notification, via the processor of the monitoring system, upon receiving the second data packet from the first person.

7. The method of claim 6, further comprising:
identifying whether one or more persons of said plurality of persons is not connected to any other person or any team based.

8. The method of claim 6, further comprising:
providing, by the processor, to a user display of the monitoring system, a command to provide a visual representation of each team, including the persons associated with each team, and to provide a visual indicator of the second person whose unique indication has not been received in the second data packet.

9. The method of claim 6, further comprising:
accessing, by the processor, a database storing a respective unique identification for one or more persons of the plurality of persons and indications of a team associated with each unique identification; and
analyzing, by the processor, the first and second data packets to determine if at least one data packet comprises the first unique identification associated with the first person from the first team and a third unique identification for a third person associated with a second team, wherein said causing provision is facilitated by said analysis by the processor.

10. The method of claim 6, further comprising: periodically receiving signals indicative of biometric data corresponding to each person, wherein a biometric data includes a core body temperature of the person, a heart rate of the person, a blood pressure of the person, a rate of perspiration of the person, a concentration of electrolytes in a fluid of the person, a respiration rate of the person, or a combination thereof.

11. The method of claim 6, further comprising: periodically receiving one or more other signals associated with one or more sensors on a site, the one or more signals being indicative of an environmental metric, wherein the environmental metric includes a temperature of an atmosphere surrounding the one or more sensors or a concentration of a flammable gas in the atmosphere surrounding the one or more sensors.

12. A non-transitory computer-readable storage medium storing instructions, said instructions operable for causing a monitoring system to at least:
   receive, by a receiver of the monitoring system, a first data packet, from a first person of a plurality of persons comprises a unique identification of the first person associated with at least one communication unit of a plurality of communication units carried by a specific person of the plurality of persons deployed to a site; and
   in an instance in which a processor of the monitoring system receives a first data packet from the at least one communication unit carried by a first person of the plurality of persons,
   wherein the first data packet comprises a unique identification of the at least one communication unit and a unique identification of at least one another communication unit carried by a second person of the plurality of persons associated with a first team of the plurality of teams;
   receiving a second data packet, from the at least one communication unit carried by the first person; wherein the second data packet comprising the unique identification of the at least one communication unit and lacking the unique identification of the at least one another communication unit carried by the second person; and
   generating a notification, via the processor of the monitoring system, upon receiving the second data packet from the first person.

13. The non-transitory computer-readable storage medium of claim 12, further storing instructions for causing the monitoring system to at least: identify whether one or more persons of said plurality of persons is not connected to any other person or any team based on the comparison.

14. The non-transitory computer-readable storage medium of claim 12, further storing instructions for causing the monitoring system to at least:
   cause provision, to a user display of the monitoring system, a command to provide a visual representation of each team, including the persons in the team, and to provide a visual indicator of the second person whose unique indication has not been received in the second data packet.

15. The non-transitory computer-readable storage medium of claim 12, further storing instructions for causing the monitoring system to at least:
   accessing, by the processor, a database storing a respective unique identification for one or more persons of the plurality of persons and indications of a team associated with each unique identification; and
   analyzing, by the processor, the first and second data packets to determine if at least one data packet comprises the first unique identification associated with the first person from the first team and a third unique identification for a third person associated with a second team, wherein said causing provision is facilitated by said analysis by the processor.

16. The non-transitory computer-readable storage medium of claim 12, further storing instructions for causing the monitoring system to at least:
   periodically receive signals indicative of biometric data corresponding to each person, wherein a biometric data includes a core body temperature of the person, a heart rate of the person, a blood pressure of the person, a rate of perspiration of the person, a concentration of electrolytes in a fluid of the person, a respiration rate of the person, or combinations thereof.

17. The non-transitory computer-readable storage medium of claim 12, further storing instructions for causing the monitoring system to at least: periodically receive one or more other signals received from one or more sensors indicative of an environmental metric, wherein the environmental metric includes a temperature of an atmosphere surrounding the one or more sensors, and a concentration of a flammable gas in the atmosphere surrounding the one or more sensors.

* * * * *